United States Patent
Kim et al.

(10) Patent No.: US 9,473,988 B2
(45) Date of Patent: Oct. 18, 2016

(54) MULTIPLEXING METHOD FOR SIGNALS RELATED TO A PLURALITY OF TERMINALS IN A WIRELESS COMMUNICATION SYSTEM APPLYING CARRIER AGGREGATION TECHNIQUES AND APPARATUS THEREFOR

(75) Inventors: Hakseong Kim, Anyang-si (KR); Hanbyul Seo, Anyang-si (KR); Daewon Lee, Anyang-si (KR); Kijun Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 324 days.

(21) Appl. No.: 14/116,195

(22) PCT Filed: Jun. 5, 2012

(86) PCT No.: PCT/KR2012/004410
§ 371 (c)(1),
(2), (4) Date: Nov. 7, 2013

(87) PCT Pub. No.: WO2012/169756
PCT Pub. Date: Dec. 13, 2012

(65) Prior Publication Data
US 2014/0079015 A1    Mar. 20, 2014

Related U.S. Application Data

(60) Provisional application No. 61/493,956, filed on Jun. 6, 2011, provisional application No. 61/505,507, filed on Jul. 7, 2011, provisional application No. 61/515,312, filed on Aug. 4, 2011.

(51) Int. Cl.
*H04W 28/26*    (2009.01)
*H04L 27/00*    (2006.01)
(Continued)

(52) U.S. Cl.
CPC .......... *H04W 28/26* (2013.01); *H04L 27/0006* (2013.01); *H04L 5/001* (2013.01); *H04L 5/0048* (2013.01); *H04L 5/0053* (2013.01); *H04W 72/00* (2013.01); *H04W 72/1289* (2013.01)

(58) Field of Classification Search
CPC ............ H04W 28/26; H04W 72/1289; H04L 27/0006; H04L 5/001; H04L 5/0048; H04L 5/0053
See application file for complete search history.

(56) References Cited

U.S. PATENT DOCUMENTS

2009/0190566 A1    7/2009  Kwon et al.
2009/0215451 A1    8/2009  Lim et al.
(Continued)

FOREIGN PATENT DOCUMENTS

KR    10-2009-0038254 A    4/2009
KR    10-2009-0083760 A    8/2009
(Continued)

*Primary Examiner* — Redentor Pasia
(74) *Attorney, Agent, or Firm* — Birch, Stewart, Kolasch & Birch, LLP

(57) ABSTRACT

The present description discloses a method for transmitting an uplink signal through a non-licensed band from a terminal in a wireless communication system by applying carrier aggregation techniques. More specifically, the method is characterized by comprising the steps of: receiving an uplink scheduling grant from a base station; determining the availability of a non-licensed band; transmitting a signal for reserving resources if a non-licensed band is available; and transmitting an uplink signal to the base station via the non-licensed band on the basis of the uplink scheduling grant.

12 Claims, 25 Drawing Sheets

(51) Int. Cl.
*H04L 5/00* (2006.01)
*H04W 72/00* (2009.01)
*H04W 72/12* (2009.01)

(56) References Cited

U.S. PATENT DOCUMENTS

2012/0039183 A1* 2/2012 Barbieri ................ H04W 16/14
370/241.1
2012/0207036 A1* 8/2012 Ong .................. H04W 74/0816
370/252
2013/0051358 A1* 2/2013 Turtinen ........... H04W 74/0816
370/330
2014/0036818 A1* 2/2014 Koskela .............. H04W 72/042
370/329
2014/0161002 A1* 6/2014 Gauvreau ............. H04W 16/24
370/280

FOREIGN PATENT DOCUMENTS

KR 10-2009-0092434 A 9/2009
KR 10-2010-0112327 A 10/2010

* cited by examiner

-- Prior Art --

FIG. 2
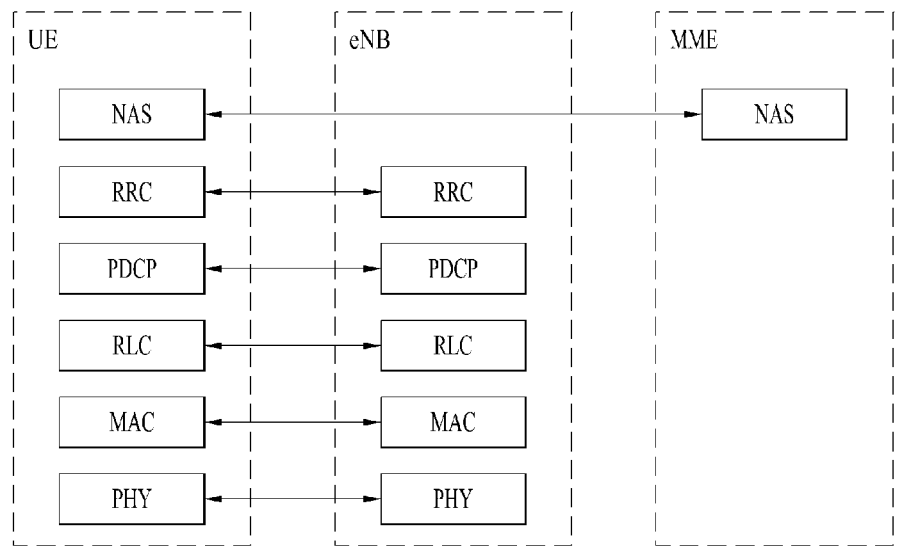
(a) contol - plane protocol stack
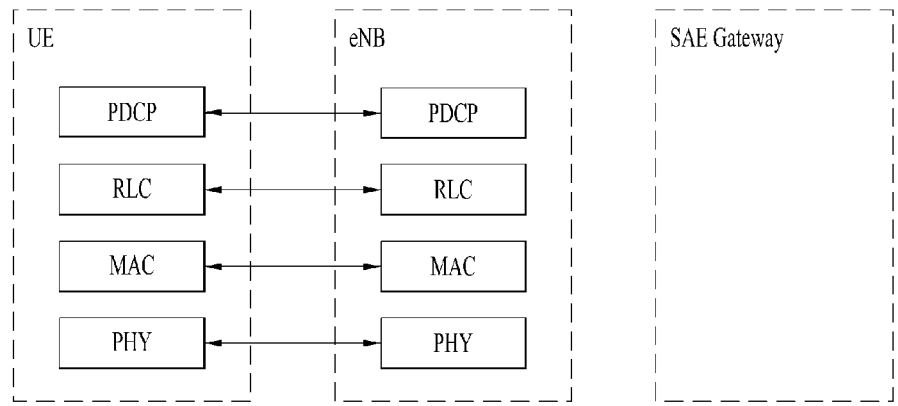
(b) user - plane protocol stack FIG. 6
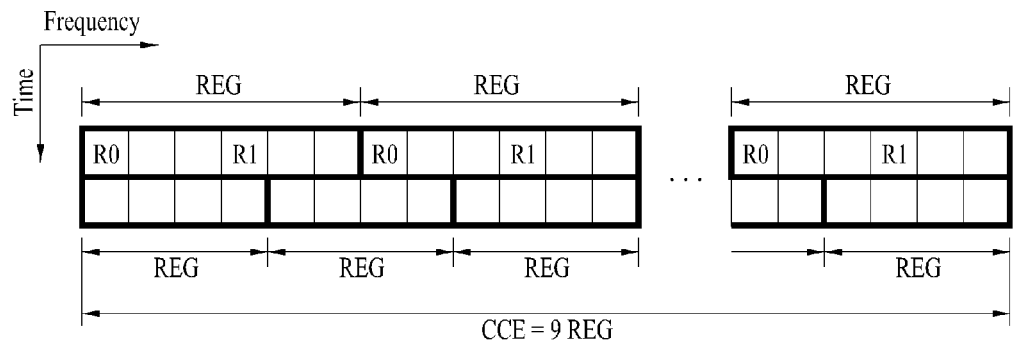
(a) 1TX or 2TX
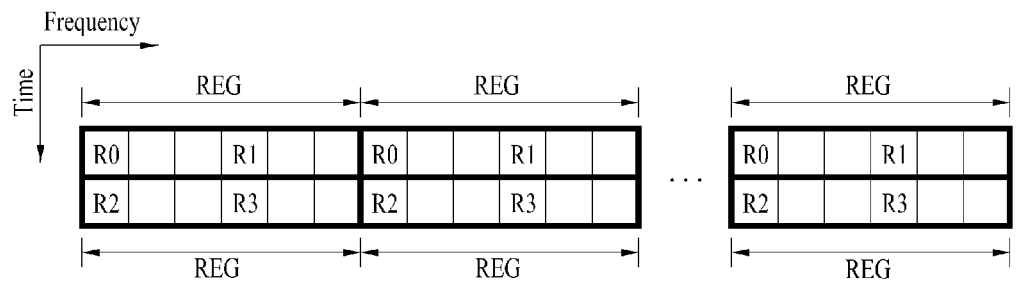
(b) 4 TX
FIG. 7
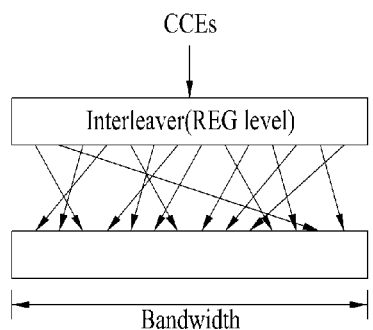

MULTIPLEXING METHOD FOR SIGNALS RELATED TO A PLURALITY OF TERMINALS IN A WIRELESS COMMUNICATION SYSTEM APPLYING CARRIER AGGREGATION TECHNIQUES AND APPARATUS THEREFOR

This application is the National Phase of PCT/KR2012/004410 filed on Jun. 5, 2012, which claims priority under 35 U.S.C. 119(e) to U.S. Provisional Application Nos. 61/493,956 filed on Jun. 6, 2011, 61/505,507 filed Jul. 7, 2011 and 61/515,312 filed on Aug. 4, 2011, all of which are hereby expressly incorporated by reference into the present application.

TECHNICAL FIELD

The present invention relates to a wireless communication system, and more particularly, to a method of multiplexing a signal related to a plurality of user equipments in a wireless communication system to which a carrier aggregation technique is applied thereto and an apparatus therefor.

BACKGROUND ART

3GPP LTE ($3^{rd}$ generation partnership project long term evolution hereinafter abbreviated LTE) communication system is schematically explained as an example of a wireless communication system to which the present invention is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "$3^{rd}$ generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE OF THE INVENTION

Technical Task

Accordingly, the present invention intends to propose a method of multiplexing a signal related to a plurality of user equipments in a wireless communication system to which a carrier aggregation technique is applied thereto and an apparatus therefor in the following description based on the discussion as mentioned in the foregoing description.

Technical Solution

To achieve these and other advantages and in accordance with the purpose of the present invention, as embodied and broadly described, according to one embodiment, a method of transmitting an uplink signal via a non-licensed band, which is transmitted by a user equipment in a wireless communication system to which a carrier aggregation scheme is applied, includes the steps of receiving an uplink scheduling grant from an eNode B, determining whether the non-licensed band is available, if the non-licensed band is available, transmitting a resource reservation signal, and transmitting the uplink signal to the eNode B via the non-licensed band based on the uplink scheduling grant.

Preferably, the uplink signal transmitted by the user equipment is multiplexed with an uplink signal transmitted by a different user equipment in terms of a space resource or a frequency resource. In this case, the determining step includes the steps of detecting a resource reservation signal of a different user equipment and if the resource reservation signal of the different user equipment corresponds to a predetermined signal, configuring the non-licensed band as an available resource. Moreover, the predetermined signal corresponds to a signal shared by the user equipment and the different user equipment in advance.

More preferably, the uplink signal transmitting step includes the step of determining again whether the non-licensed band is available immediately before a transmission timing of the uplink signal. In this case, if the non-licensed band is available as a result of determining again whether the non-licensed band is available, the uplink signal transmitting step includes the step of transmitting the uplink signal to the eNode B after a predetermined transmission gap.

To further achieve these and other advantages and in accordance with the purpose of the present invention, according to a different embodiment, a user equipment device in a wireless communication system to which a carrier aggregation scheme is applied includes a receiving module configured to receive an uplink scheduling grant from an eNode B, a processor configured to determine whether a non-licensed band is available, and if the non-licensed band is available, a transmitting module configured to transmit a resource reservation signal, the processor configured to control the transmitting module to transmit the uplink signal to the eNode B via the non-licensed band based on the uplink scheduling grant after transmitting the resource reservation signal.

Preferably, the uplink signal transmitted by the user equipment device is multiplexed with an uplink signal transmitted by a different user equipment device in terms of a space resource or a frequency resource. In this case, the processor is configured to detect a resource reservation signal of a different user equipment device and if the resource reservation signal of the different user equipment device corresponds to a predetermined signal, the processor is configured to set the non-licensed band as an available resource. Moreover, the predetermined signal corresponds to a signal shared by the user equipment device and the different user equipment device in advance.

More preferably, the processor is configured to determine again whether the non-licensed band is available immediately before a transmission timing of the uplink signal. In this case, if the non-licensed band is available as a result of determining again whether the non-licensed band is available, the processor is configured to control the transmitting module to transmit the uplink signal to the eNode B after a predetermined transmission gap.

Advantageous Effects

According to embodiments of the present invention, if a carrier aggregation technique is applied to a wireless communication system, an eNode B can efficiently multiplexes a signal transceived with a plurality of user equipments using a non-licensed band.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

FIG. 2 is a diagram for structures of control and user planes of radio interface protocol between a 3GPP radio access network standard-based user equipment and E-UTRAN;

FIG. 6 is a diagram of a resource unit used for constructing a control channel;

FIG. 7 is a diagram of an example of scattering CCE on a system band;

BEST MODE

Mode for Invention

Figure 1:
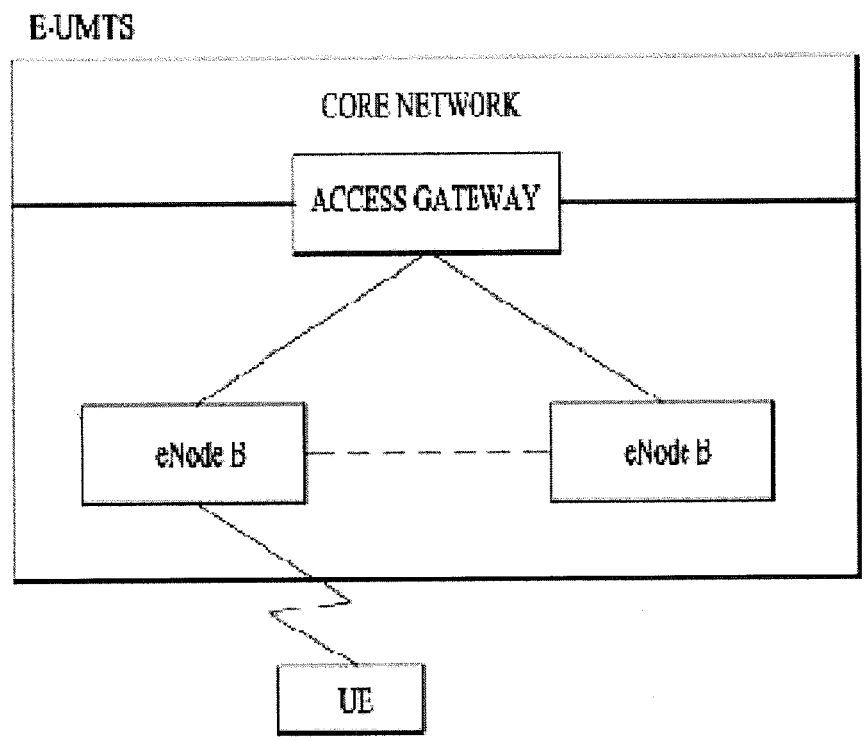
FIG. 1 is a schematic diagram of E-UMTS network structure as one example of a wireless communication system.

In the following description, compositions of the present invention, effects and other characteristics of the present invention can be easily understood by the embodiments of the present invention explained with reference to the accompanying drawings. Embodiments explained in the following description are examples of the technological features of the present invention applied to 3GPP system.

In this specification, the embodiments of the present invention are explained using an LTE system and an LTE-A system, which is exemplary only. The embodiments of the present invention are applicable to various communication systems corresponding to the above mentioned definition. In particular, although the embodiments of the present invention are described in the present specification on the basis of FDD, this is exemplary only. The embodiments of the present invention can be applied to H-FDD or TDD in a manner of being easily modified.

FIG. 2 is a diagram for structures of control and user planes of radio interface protocol between a 3GPP radio access network standard-based user equipment and E-UTRAN. The control plane means a path on which control messages used by a user equipment (UE) and a network to manage a call are transmitted. The user plane means a path on which such a data generated in an application layer as audio data, internet packet data, and the like are transmitted.

A physical layer, which is a $1^{st}$ layer, provides higher layers with an information transfer service using a physical channel. The physical layer is connected to a medium access control layer situated above via a transport channel. Data moves between the medium access control layer and the physical layer on the transport channel. Data moves between a physical layer of a transmitting side and a physical layer of a receiving side on the physical channel. The physical channel utilizes time and frequency as radio resources. Specifically, the physical layer is modulated by OFDMA (orthogonal frequency division multiple access) scheme in DL and the physical layer is modulated by SC-FDMA (single carrier frequency division multiple access) scheme in UL.

Medium access control (hereinafter abbreviated MAC) layer of a $2^{nd}$ layer provides a service to a radio link control (hereinafter abbreviated RLC) layer, which is a higher layer, on a logical channel. The RLC layer of the $2^{nd}$ layer supports a reliable data transmission. The function of the RLC layer may be implemented by a function block within the MAC. PDCP (packet data convergence protocol) layer of the $2^{nd}$ layer performs a header compression function to reduce unnecessary control information, thereby efficiently transmitting such IP packets as IPv4 packets and IPv6 packets in a narrow band of a radio interface.

Radio resource control (hereinafter abbreviated RRC) layer situated in the lowest location of a $3^{rd}$ layer is defined on a control plane only. The RRC layer is responsible for control of logical channels, transport channels and physical channels in association with a configuration, a re-configuration and a release of radio bearers (hereinafter abbreviated RBs). The RB indicates a service provided by the $2^{nd}$ layer for a data delivery between the user equipment and the network. To this end, the RRC layer of the user equipment and the RRC layer of the network exchange a RRC message with each other. In case that there is an RRC connection (RRC connected) between the user equipment and the RRC layer of the network, the user equipment lies in the state of RRC connected (connected mode). Otherwise, the user equipment lies in the state of RRC idle (idle mode). A non-access stratum (NAS) layer situated at the top of the RRC layer performs such a function as a session management, a mobility management and the like.

A single cell consisting of an eNode B is set to one of 1.25 MHz, 2.5 MHz, 5 MHz, 10 MHz, 15 MHz, and 20 MHz of bandwidths and then provides a downlink or uplink transmission service to a plurality of user equipments. Different cells can be configured to provide corresponding bandwidths, respectively.

DL transport channels for transmitting data from a network to a user equipment include a BCH (broadcast channel) for transmitting a system information, a PCH (paging channel) for transmitting a paging message, a downlink SCH (shared channel) for transmitting a user traffic or a control message and the like. DL multicast/broadcast service traffic or a control message may be transmitted on the DL SCH or a separate DL MCH (multicast channel). Meanwhile, UL transport channels for transmitting data from a user equipment to a network include a RACH (random access channel) for transmitting an initial control message, an uplink SCH (shared channel) for transmitting a user traffic or a control message. A logical channel, which is situated above a transport channel and mapped to the transport channel, includes a BCCH (broadcast channel), a PCCH (paging control channel), a CCCH (common control channel), a MCCH (multicast control channel), a MTCH (multicast traffic channel) and the like.

Figure 3:
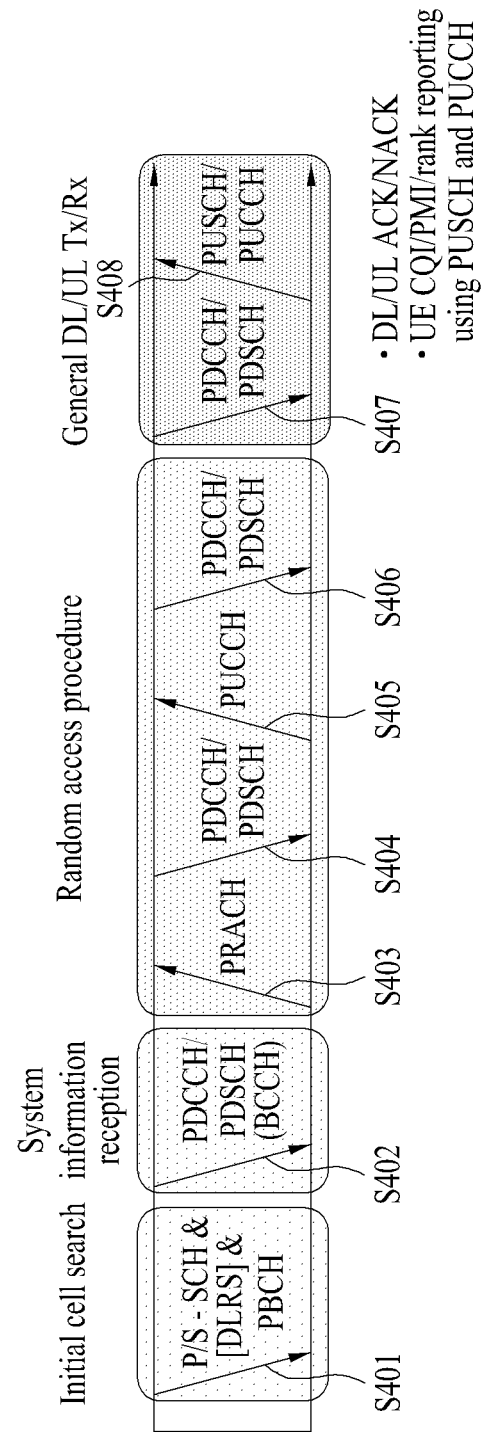
FIG. 3 is a diagram for explaining physical channels used for 3GPP system and a general signal transmission method using the physical channels.

FIG. 3 is a diagram for explaining physical channels used for 3GPP system and a general signal transmission method using the physical channels.

If a power of a user equipment is turned on or the user equipment enters a new cell, the user equipment may perform an initial cell search job for matching synchronization with an eNode B and the like [S301]. To this end, the user equipment may receive a primary synchronization channel (P-SCH) and a secondary synchronization channel (S-SCH) from the eNode B, may be synchronized with the eNode B and may be then able to obtain information such as a cell ID and the like. Subsequently, the user equipment receives a physical broadcast channel from the eNode B and may be then able to obtain intra-cell broadcast information. Meanwhile, the user equipment receives a downlink reference signal (DL RS) in the initial cell search step and may be then able to check a DL channel state.

Having completed the initial cell search, the user equipment may receive a physical downlink shared control channel (PDSCH) according to a physical downlink control channel (PDCCH) and an information carried on the physical downlink control channel (PDCCH). The user equipment may be then able to obtain detailed system information [S302].

Meanwhile, if a user equipment initially accesses an eNode B or does not have a radio resource for transmitting a signal, the user equipment may be able to perform a random access procedure (RACH) to complete the access to the eNode B [S303 to S306]. To this end, the user equipment may transmit a specific sequence as a preamble on a physical random access channel (PRACH) [S303] and may be then able to receive a response message on PDCCH and the corresponding PDSCH in response to the preamble [S304]. In case of a contention based random access procedure (RACH), it may be able to additionally perform a contention resolution procedure.

Having performed the above mentioned procedures, the user equipment may be able to perform a PDCCH/PDSCH reception [S307] and a PUSCH/PUCCH (physical uplink shared channel/physical uplink control channel) transmission [S308] as a general uplink/downlink signal transmission procedure. In particular, the user equipment receives a DCI (downlink control information) on the PDCCH. In this case, the DCI includes such a control information as an information on resource allocation to the user equipment. The format of the DCI varies in accordance with its purpose.

Meanwhile, control information transmitted to an eNode B from a user equipment via UL or the control information received by the user equipment from the eNode B includes downlink/uplink ACK/NACK signals, CQI (Channel Quality Indicator), PMI (Precoding Matrix Index), RI (Rank Indicator) and the like. In case of 3GPP LTE system, the user equipment may be able to transmit the aforementioned control information such as CQI/PMI/RI and the like on PUSCH and/or PUCCH.

Figure 4:
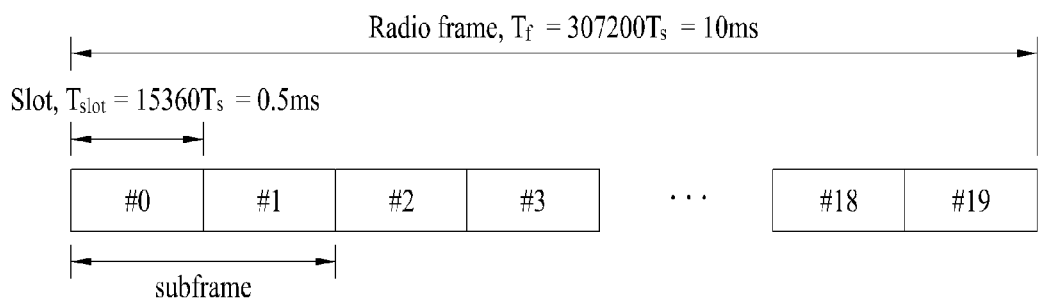
FIG. 4 is a diagram for a structure of a radio frame in LTE system.

FIG. 4 is a diagram for a structure of a radio frame used in an LTE system.

Referring to FIG. 4, one radio frame has a length of 10 ms ($327{,}200 \times T_S$) and is constructed with 10 subframes in equal size. Each of the subframes has a length of 1 ms and is constructed with two slots. Each of the slots has a length of 0.5 ms (15,360×$T_S$). In this case, $T_s$ indicates a sampling time and is represented as $T_s$=1/(15 kHz×2048)=3.2552× $10^{-8}$ (i.e., about 33 ns). The slot includes a plurality of OFDM symbols in a time domain and also includes a plurality of resource blocks (RBs) in a frequency domain. In the LTE system, one resource block includes '12 subcarriers×7 or 6 OFDM symbols'. A transmission time interval (TTI), which is a unit time for transmitting data, can be determined by at least one subframe unit. The aforementioned structure of a radio frame is just exemplary. And, the number of subframes included in a radio frame, the number of slots included in a subframe and the number of OFDM symbols included in a slot may be modified in various ways.

Figure 5:
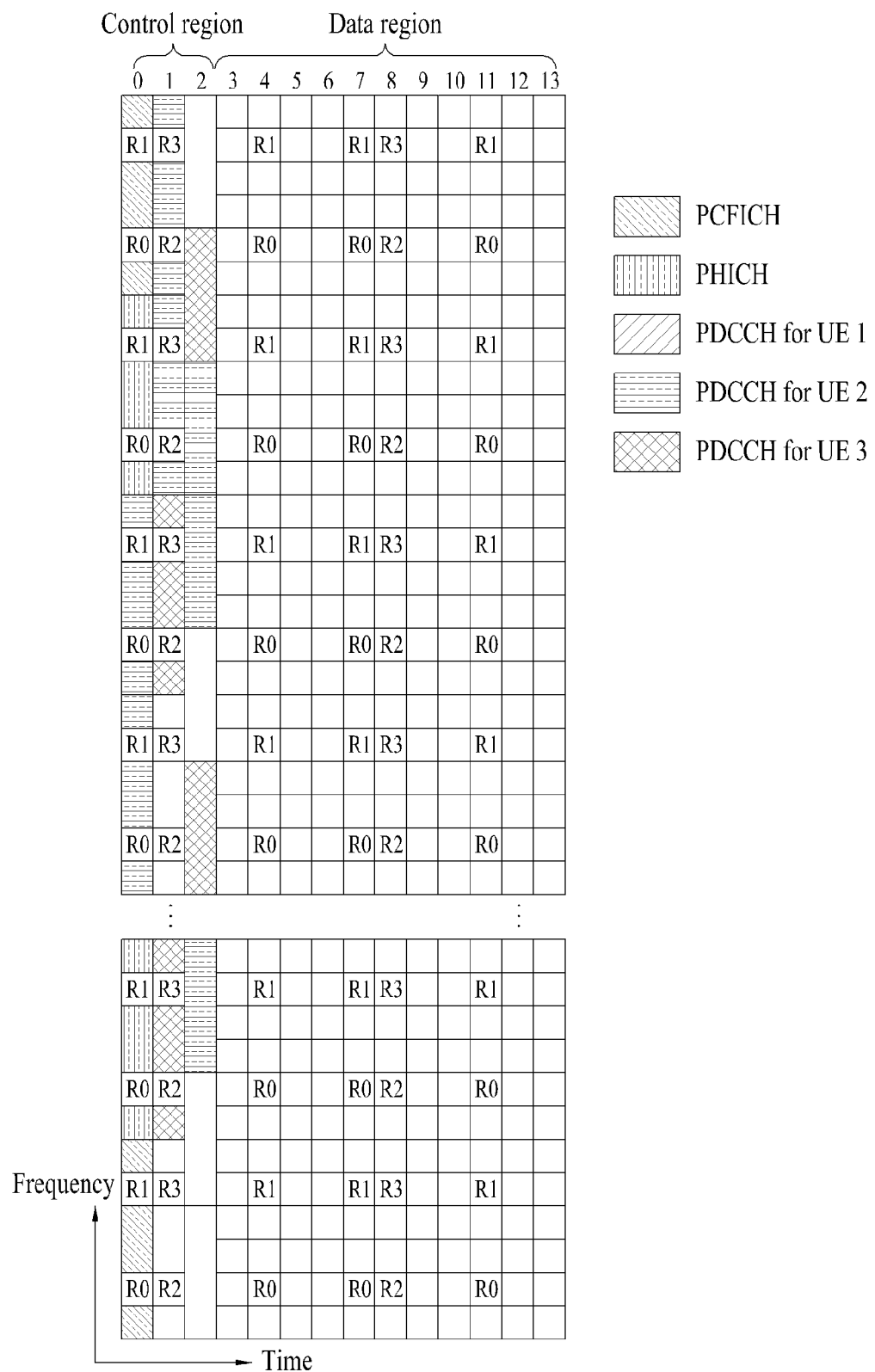
FIG. 5 is a diagram for a structure of a downlink radio frame in LTE system.

FIG. 5 is a diagram for showing an example of a control channel included in a control region of a single subframe in a DL radio frame.

Referring to FIG. 5, a subframe consists of 14 OFDM symbols. According to a subframe configuration, the first 1 to 3 OFDM symbols are used for a control region and the other 13~11 OFDM symbols are used for a data region. In the diagram, R1 to R4 may indicate a reference signal (hereinafter abbreviated RS) or a pilot signal for antennas 0 to 3. The RS is fixed as a constant pattern in the subframe irrespective of the control region and the data region. The control channel is assigned to a resource to which the RS is not assigned thereto among the control region and a traffic channel is also assigned to a resource to which the RS is not assigned thereto among the data region. The control channel assigned to the control region may include a physical control format indicator channel (PCFICH), a physical hybrid-ARQ indicator channel (PHICH), a physical downlink control channel (PDCCH) and the like.

The physical control format indicator channel (PCFICH) informs a user equipment of the number of OFDM symbols used for the PDCCH in every subframe. The PCFICH is situated at the first OFDM symbol and is configured prior to the PHICH and the PDCCH. The PCFICH consists of 4 resource element groups (REG) and each of the REGs is distributed in the control region based on a cell ID (cell identity). One REG consists of 4 resource elements (RE). The RE may indicate a minimum physical resource defined as 'one subcarrier×one OFDM symbol'. The value of the PCFICH may indicate the value of 1 to 3 or 2 to 4 according to a bandwidth and is modulated by a QPSK (quadrature phase shift keying).

The physical hybrid-ARQ indicator channel (PHICH) is used for carrying HARQ ACK/NACK for an UL transmission. In particular, the PHICH indicates a channel in which DL ACK/NACK information for UL HARQ is transmitted. The PHICH consists of a single REG and is scrambled cell-specifically. The ACK/NACK is indicated with 1 bit and is modulated by BPSK (binary phase shift keying). The modulated ACK/NACK is spread into a spread factor (SF) 2 or 4. A plurality of PHICHs, which are mapped to a same resource, composes a PHICH group. The number of PHICH, which is multiplexed by the PHICH group, is determined according to the number of spreading code. The PHICH (group) is repeated three times to obtain diversity gain on a frequency domain and/or a time domain.

The physical downlink control channel (PDCCH) is assigned to the first n OFDM symbol of a subframe. In this case, the n is an integer more than 1 and indicated by the PCFICH. The PDCCH consists of at least one CCE. The PDCCH informs each of user equipments or a user equipment group of information on resource allocation of a PCH (paging channel) and a DL-SCH (downlink-shared channel), which correspond to transport channels, an uplink scheduling grant, HARQ information and the like. The PCH (paging channel) and the DL-SCH (downlink-shared channel) are transmitted on the PDSCH. Hence, an eNode B and a user equipment transmit and receive data on the PDSCH in general except a specific control information or a specific service data.

Information for indicating prescribed user equipment (one or a plurality of user equipments) configured to receive data of the PDSCH, information for indicating a method of receiving/decoding the PDSCH data, and the like are transmitted in a manner of being included in the PDCCH. For instance, assume that a specific PDCCH is CRC masked with an RNTI (radio network temporary identity) called "A" and information on data transmitted using a radio resource (e.g., frequency position) called "B" and a transmission form information (e.g., a transport block size, a modulation scheme, coding information, and the like) called "C" is transmitted in a specific subframe. In this case, the user equipment within a cell monitors the PDCCH using the RNTI information of the user equipment. If there exist at least one or more user equipments having the "A" RNTI, the user equipments receive the PDCCH. And, the user equipments receives the PDSCH, which is indicated by the "B" and the "C", via the received information of the PDCCH.

FIG. 6 is a diagram of a resource unit used for constructing a control channel. In particular, FIG. 6 (a) indicates a case that the number of transmitting antenna of an eNode B corresponds to 1 or 2 and FIG. 6 (b) indicates a case that the number of antenna of the eNode B corresponds to 4. A reference signal (RS) pattern varies according to the number of transmitting antenna but a method of configuring a resource unit related to a control channel is identical irrespective of the number of transmitting antenna.

Referring to FIG. 6, a base unit of a control channel is a REG. The REG consists of 4 neighboring resource elements except an RS. The REG is represented in the drawing with a bold line. The PCFICH and the PHICH include 4 REGs and 3 REGs, respectively. The PDCCH consists of a CCE (control channel element) unit and one CCE includes 9 REGs.

In order for a UE to check whether the PDCCH consisted of L number of CCEs is transmitted to the UE, the UE is configured to check the $M^{(L)}$ (≥L) number of contiguous CCEs or the CCEs arranged by a specific rule. A value of the L, which should be considered for the UE to receive the PDCCH, may become a plural number. The UE should check CCE aggregations to receive the PDCCH. The CCE aggregations are called a search space. As an example, the search space is defined by LTE system as Table 1.

TABLE 1

| Search space $S_k^{(L)}$ | | Number of PDCCH | |
|---|---|---|---|
| Type | Aggregation level L | Size [in CCEs] | candidates $M^{(L)}$ | DCI formats |
| UE-specific | 1 | 6 | 6 | 0, 1, 1A, 1B, 2 |
| | 2 | 12 | 6 | |
| | 4 | 8 | 2 | |
| | 8 | 16 | 2 | |
| Common | 4 | 16 | 4 | 0, 1A, 1C, 3/3A |
| | 8 | 16 | 2 | |

In this case, CCE aggregation level L indicates the number of CCEs configuring the PDCCH, $S_k^{(L)}$ indicates a search space of the CCE aggregation level L, and $M^{(L)}$ indicates the number of candidate PDCCH, which should be monitored in the search space of the aggregation level L.

The search space can be classified into a UE-specific search space accessible by a specific UE only and a common search space accessible by all UEs in a cell. A UE monitors the common search space of which the CCE aggregation level corresponds to 4 and 8 and monitors the UE-specific search space of which the CCE aggregation level corresponds to 1, 2, 4, and 8. The common search space and the UE-specific search space may overlap with each other.

And, a position of a first (having a smallest index) CCE in a PDCCH search space, which is given to a random UE for each CCE aggregation level value, varies in every subframe depending on a user equipment. This is called a PDCCH search space hashing.

FIG. 7 is a diagram of an example of scattering CCE on a system band. Referring to FIG. 7, a plurality of logically contiguous CCEs are inputted to an interleaver. The interleaver performs a function of mixing the inputted plurality of CCEs by a REG unit. Hence, frequency/time resources constructing one CCE are physically distributed to a whole frequency/time domain in a control region of a subframe in a manner of being scattered. Consequently, frequency diversity and interference randomization gain can be maximized in a manner of performing the interleaving by the REG unit although the control channel is constructed by the CCE unit.

Figure 8:
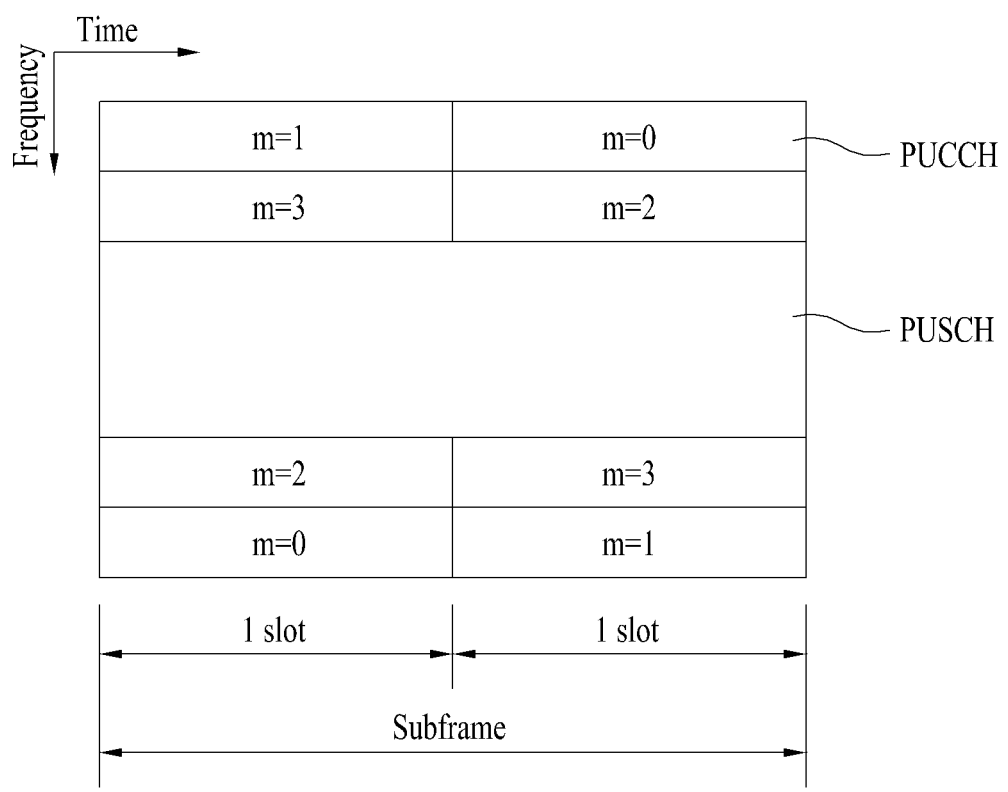
FIG. 8 is a diagram for a structure of an uplink subframe used in LTE system.

FIG. 8 is a diagram for a structure of an uplink subframe used in LTE system.

Referring to FIG. 8, an UL subframe can be divided into a region to which a physical uplink control channel (PUCCH) carrying control information is assigned and a region to which a physical uplink shared channel (PUSCH) carrying a user data is assigned. A middle part of the subframe is assigned to the PUSCH and both sides of a data region are assigned to the PUCCH in a frequency domain. The control information transmitted on the PUCCH includes an ACK/NACK used for HARQ, a CQI (channel quality indicator) indicating a DL channel status, an RI (rank indicator) for MIMO, an SR (scheduling request) corresponding to an UL resource allocation request, and the like. The PUCCH for a single UE uses one resource block, which occupies a frequency different from each other in each slot within a subframe. In particular, 2 resource blocks assigned to the PUCCH are frequency hopped on a slot boundary. In particular, FIG. 8 shows an example that the PUCCHs satisfying conditions (e.g., m=0, 1, 2, 3) are assigned to a subframe.

Figure 9:
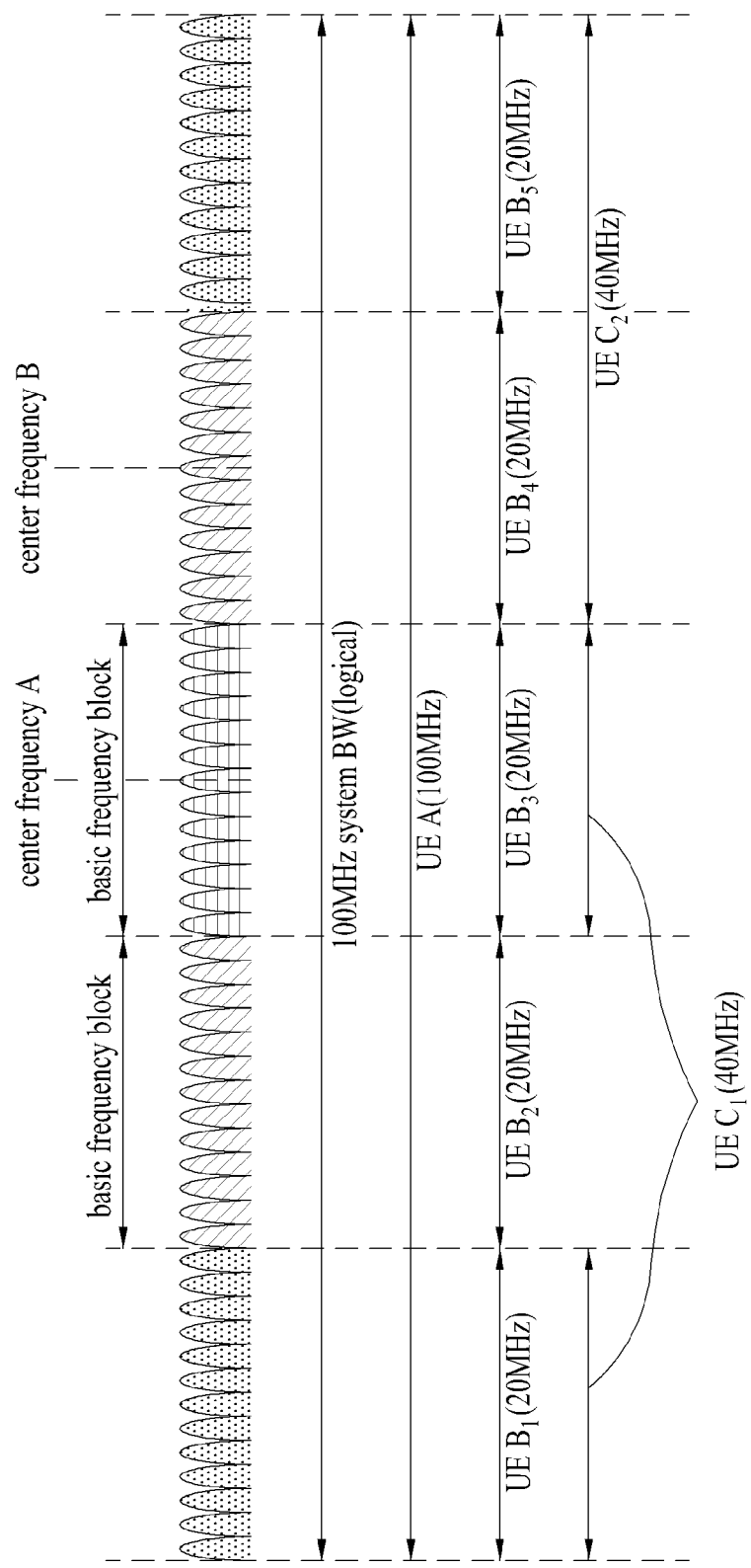
FIG. 9 is a conceptual diagram for explaining a carrier aggregation scheme.

In the following description, a carrier aggregation scheme is explained. FIG. 9 is a conceptual diagram for explaining a carrier aggregation scheme.

A carrier aggregation means a technology using one big logical frequency band in a manner that a user equipment uses a frequency block configured with an uplink resource (or a component carrier) and/or a downlink resource (or a component carrier) or a plurality of cells (of logical meaning) in order for a wireless communication system to use a wider frequency band. For clarity, a terminology of 'component carrier' is consistently used in the following description.

Referring to FIG. 9, a total system bandwidth (system BW) may have a system bandwidth up to maximum 100 MHz as a logical bandwidth. The total system bandwidth includes five component carriers and each of the component carriers may have up to maximum 20 MHz. The component carrier includes at least one physically contiguous subcarrier. Although each of the component carriers in FIG. 9 is depicted as including an identical bandwidth, this is exemplary only. Each of the component carriers may be able to have a bandwidth different from each other. And, although each of the component carriers is depicted as it is adjacent to each other in frequency domain, since the diagram is depicted in terms of a logical concept, each of the component carriers may be physically adjacent to each other or may be apart from each other.

A center frequency can be differently used for each of the component carriers or a common center frequency can be used for the component carriers physically adjacent to each other. As an example, in FIG. 9, if assumed that all component carriers are physically adjacent to each other, a center frequency 'A' can be used. Or, if assumed that each of the component carriers is not physically adjacent to each other, such a separate center frequency as a center frequency 'A', a center frequency 'B' or the like can be used for each of the component carriers.

In the present specification, a component carrier may correspond to a system bandwidth of a legacy system. By defining the component carrier on the basis of the legacy system, it may become easy to provide backward compatibility and to design a system in a radio communication environment in which an evolved UE and a legacy UE coexist. As an example, in case that LTE-A system supports a carrier aggregation, each of the component carriers may correspond to a system bandwidth of LTE system. In this case, the component carrier may have a prescribed bandwidth among the bandwidths of 1.25 MHz, 2.5 MHz, 5 MHz, 10 MHz, or 20 MHz.

In case that a total system bandwidth is expanded by a carrier aggregation, a frequency band used for communicating with each UE is defined by a component carrier unit. A UE A may use 100 MHz corresponding to the total system bandwidth and performs a communication in a manner of using all of the five component carriers. A UE $B_1$~$B_5$ can use a bandwidth of 20 MHz only and performs a communication by using one component carrier. A UE $C_1$ and a UE $C_2$ can use a bandwidth of 40 MHz and performs a communication by using two component carriers, respectively. The two component carriers may or may not be logically/physically adjacent to each other. The UE $C_1$ indicates a case that the UE $C_1$ uses two component carriers not adjacent to each other and the UE $C_2$ indicates a case that the UE $C_2$ uses two component carriers adjacent to each other.

LTE system uses one DL component carrier and one UL component carrier. On the other hand, LTE-A system may use a plurality of component carriers as depicted in FIG. 9. In this case, a scheme of scheduling a data channel, which is scheduled by a control channel, can be divided into a conventional linked carrier scheduling scheme and a cross carrier scheduling scheme.

More specifically, in case of the linked carrier scheduling scheme, similar to a legacy LTE system using a single component carrier, a control channel transmitted on a specific component carrier schedules a data channel only via the specific component carrier.

Meanwhile, in case of the cross carrier scheduling scheme, a control channel transmitted on a primary component carrier (primary CC) schedules a data channel transmitted on the primary component carrier or a different component carrier using a carrier indicator field (hereinafter abbreviated CIF).

Figure 10:
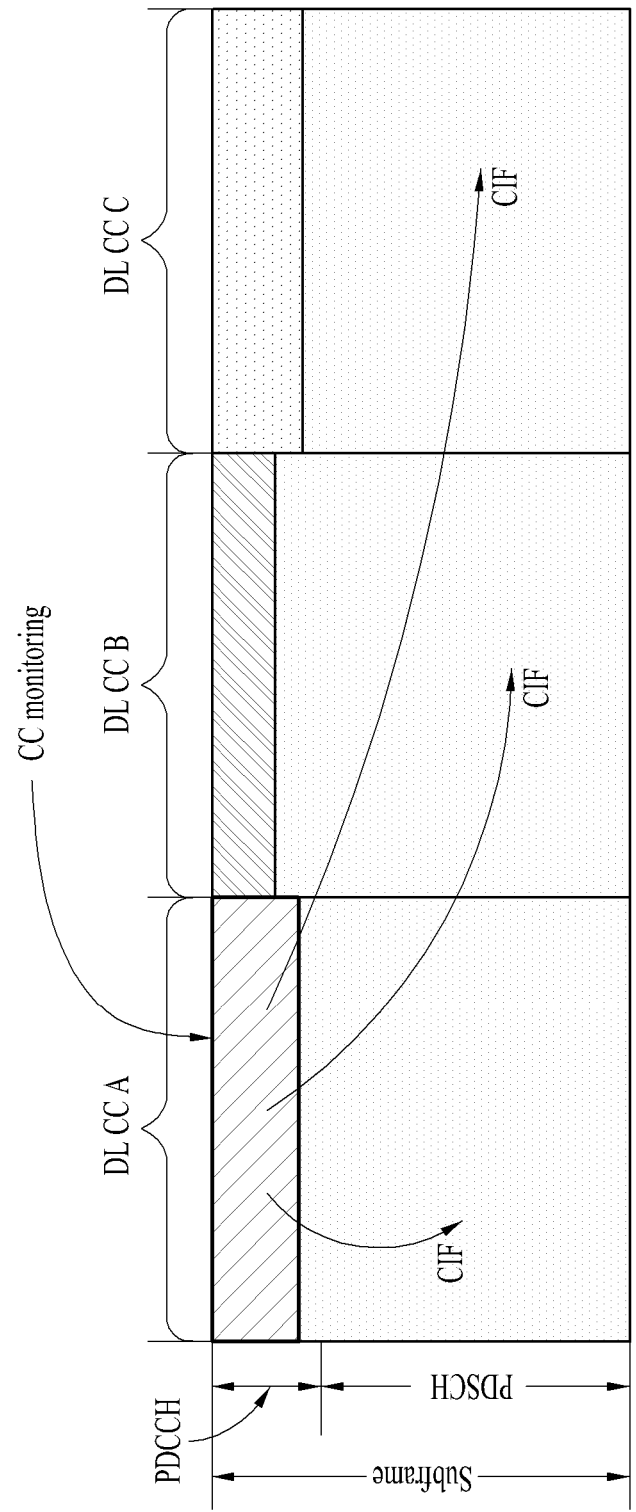
FIG. 10 is a diagram of an example to which a cross carrier scheduling scheme is applicable.

FIG. 10 is a diagram of an example to which a cross carrier scheduling scheme is applicable. In particular, the number of cell (or, a component carrier) assigned to a relay node corresponds to 3 in FIG. 10. As mentioned in the foregoing description, the cross carrier scheduling is performed using a CIF. In this case, assume that a DL cell (or, a component carrier) #A is a primary DL component carrier (i.e., a primary cell (PCell)) and assume that a component carrier #B and a component carrier #C are a secondary component carriers (i.e., secondary cell (Scell)).

In the following description, a method of utilizing a non-licensed band in LTE-A system is described.

Figure 11:
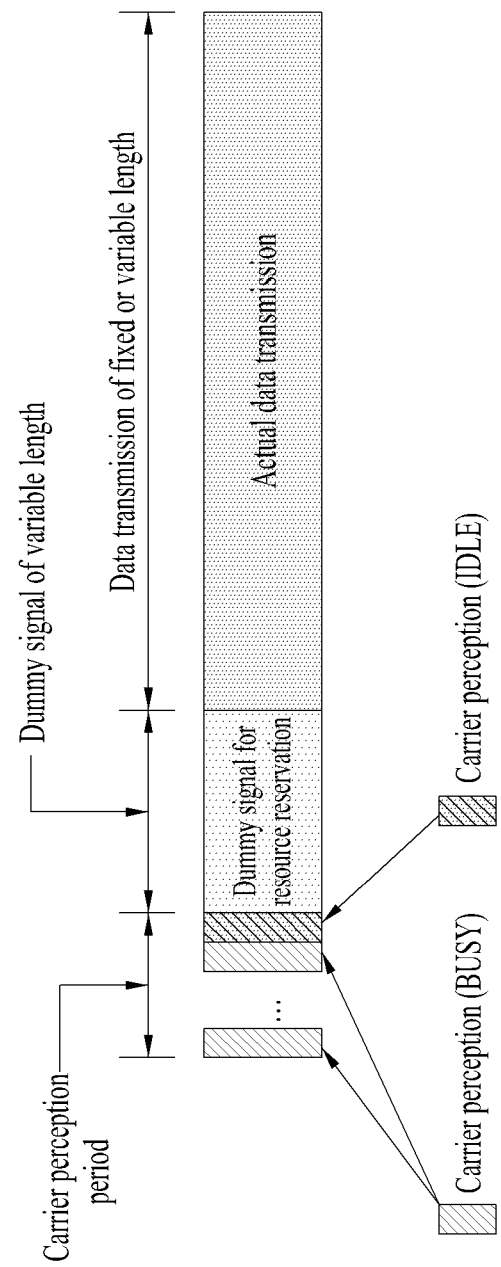
FIG. 11 is a diagram for an example of a process of securing a non-licensed band.

FIG. 11 is a diagram for an example of a process of securing a non-licensed band.

Referring to FIG. 11, as a method of transmitting/receiving a signal using a non-licensed band shared by a plurality of systems, there is a method of reserving an available resource using a dummy signal and performing a real transmission on a designated time. This method is significantly useful for a communication system intending to competitively secure a non-licensed band, i.e., to stably secure a resource intended to use by the communication system from other communication systems operating in a contention-based. Yet, since a dummy signal used for securing a resource includes no information, there exists a problem of wasting a corresponding resource. In order to solve the problem, it is possible to replace the dummy signal with a signal including specific information.

Basically, in case of applying a spatial multiplexing scheme to a system proposed in FIG. 11, a plurality of users use an identical resource region. If an eNB perceives a carrier and a corresponding resource is in an idle state in DL, it is able to transmit in a manner of appropriately multiplexing a plurality of UEs intending to perform a spatial multiplexing in a corresponding region. Yet, if pluralities of the UEs are scheduled with a spatial multiplexing form in UL, each UE individually performs a carrier perception to secure a resource necessary for each UE to transmit. If a UE among a plurality of the UEs succeeds in securing a resource, the UE transmits a dummy signal and other UEs supposed to be spatial multiplexed cannot secure a resource due to the dummy signal.

As a method of solving the aforementioned problem, a dummy signal can be configured as a sequence or a signal form (hereinafter called a resource reservation signal). Unlike a non-MIMO UE, MU-MIMO UE should be able to obtain predetermined information from the dummy signal. By doing so, resource reservation information can be transceived between MU-MIMO UEs. If one of the MU-MIMO UEs succeeds in making a reservation for a resource, other MU-MIMO UEs can perform a transmission using a spatial multiplexing in a designated subframe or a band although other MU-MIMO UEs fail in making a reservation for a resource.

In other word, if a single UE succeeds in making a reservation for a resource in a situation that a plurality of UEs perform MU-MIMO, other UEs are unable to reserve a resource and MU-MIMO transmission itself becomes infeasible. Hence, if one of users, which are spatially multiplexed together, succeeds in making a reservation for a resource, it is necessary to make the dummy signal inform of the success to solve the aforementioned problem. In this case, the dummy signal has a meaning of an MU-MIMO resource reservation indicator. According to the method, in case of performing the MU-MIMO, the dummy signal should be differently configured from that of a legacy non-MIMO. In addition, MU-MIMO UEs should be able to check whether a resource reservation is successfully performed by a UE multiplexed together in a manner of detecting the dummy signal.

Figure 12:
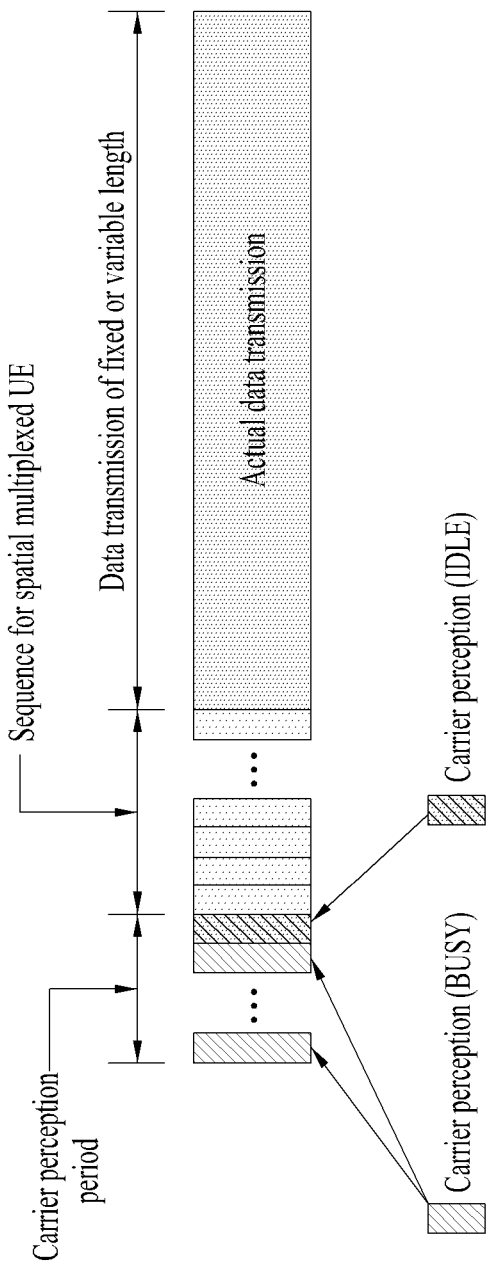
FIG. 12 is a diagram for an example of a method of applying a spatial multiplexing scheme to a non-licensed band according to embodiment of the present invention.

FIG. 12 is a diagram for an example of a method of applying a spatial multiplexing scheme to a non-licensed band according to embodiment of the present invention.

Referring to FIG. 12, by transmitting a predetermined sequence for informing of a resource reservation instead of a simple dummy signal, it is able to know whether at least one of MU-MIMO UEs multiplexed together succeeds in making a reservation for a resource. After detecting the sequence, if it is a simple dummy signal or a sequence for a different UE except the UE multiplexed together, MU-MIMO transmission is not feasible in a corresponding subframe.

Another method of solving the previously proposed resource reservation conflict problem between MU-MIMO UEs is to make a reservation for a resource by an eNB (It may not mandatorily be an eNB. A separate entity having a full charge of a resource reservation may be used to implement the method) in a manner of transmitting a dummy signal irrespective of a transmission and reception instead of making a reservation for a resource by a legacy transmitting part (in this case, a UE) by transmitting a dummy signal. And, the UE performs an MU-MIMO transmission in a designated subframe according to a scheduling of the eNB. In this case, a dummy signal identical to a legacy dummy signal is applicable to non-MIMO, SU-MIMO, and MU-MIMO. This method is not a technique limited to MIMO and can be introduced to a general transmission.

Figure 13:
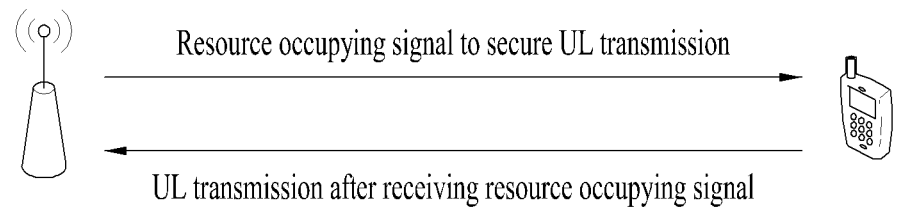
FIG. 13 and FIG. 14 exemplify a method for an eNB to secure a resource to be used for UL transmission of a UE via a carrier perception.
Figure 14:
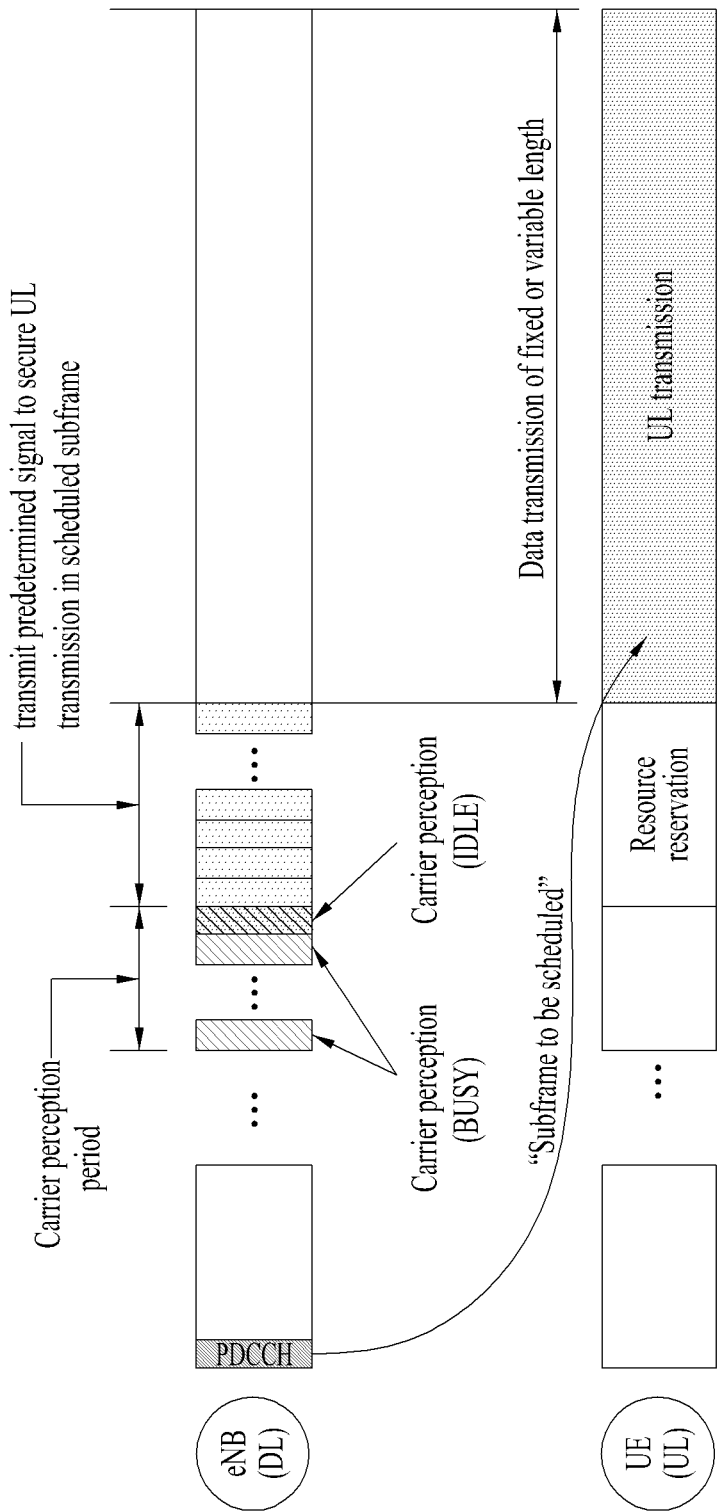

FIG. 13 and FIG. 14 exemplify a method for an eNB to secure a resource to be used for UL transmission of a UE via a carrier perception.

A UL scheduling grant received on PDCCH induces a PUSCH transmission in 4 subframes. Yet, as depicted in FIG. 14, since it is not able to completely guarantee a transmission in 4 subframes, an eNB performs a carrier perception on a time prior to arriving at 4 subframes. If a non-licensed band is not in use, the eNB can secure a resource by transmitting a predetermined signal to secure the non-licensed band.

In this case, a main entity for transmitting the predetermined signal is not a UE but an eNB. The eNB continuously performs a carrier perception procedure for the non-licensed band to secure an UL transmission resource of each UE and performs a resource reservation using a predetermined signal as depicted in FIG. 13 in order for the eNB to guarantee an UL transmission of UEs. Of course, the eNB can perform an identical role in DL as well.

Moreover, although the eNB performs the carrier perception procedure to make a reservation for a resource, a separate additional device can efficiently secure and release a resource in a manner of being installed in several places in a cell boundary.

Meanwhile, although an eNB in FIG. 13 performs a carrier perception and a resource securement, the eNB cannot perfectly guarantee a UL transmission of a UE. This is because a result of a carrier perception of the eNB may be different from a result of a carrier perception of the UE. In particular, this is because the eNB cannot consider a third UE not perceived or a part affecting the UE by the eNB. As a supplementation for the problem, although the eNB secures and maintains a resource, the eNB can induce the UE to avoid an unnecessary transmission in a manner of performing a carrier perception again and then reducing a collision probability immediately before the UE performs a UL transmission.

As mentioned in the foregoing description, multiple users can use a resource reservation signal to share a band. And, a plurality of users can share a space resource in LTE system. In case of using a resource reservation signal recognizable by the users capable of sharing a UL space resource is used, although a single user makes a reservation for a PUSCH resource by transmitting a resource reservation signal, if a different user is judged as a user sharing a resource in a manner of detecting the resource reservation signal, PUSCH transmission can be performed by the different user on a designated time.

Figure 15:
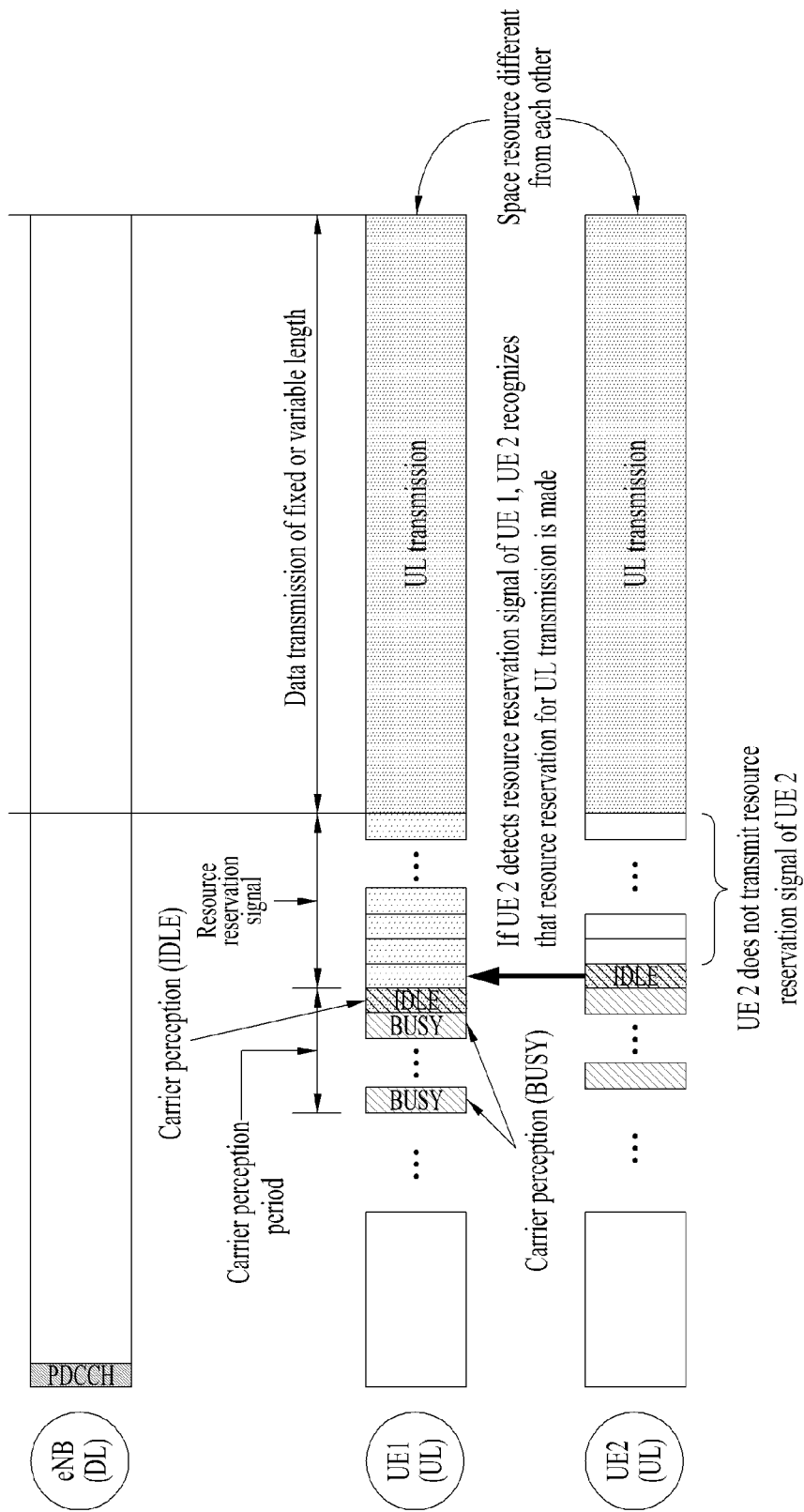
FIG. 15 and FIG. 16 are diagrams for an example of performing UL transmission, which is performed by multiple users using a non-licensed band according to embodiment of the present invention.
Figure 16:
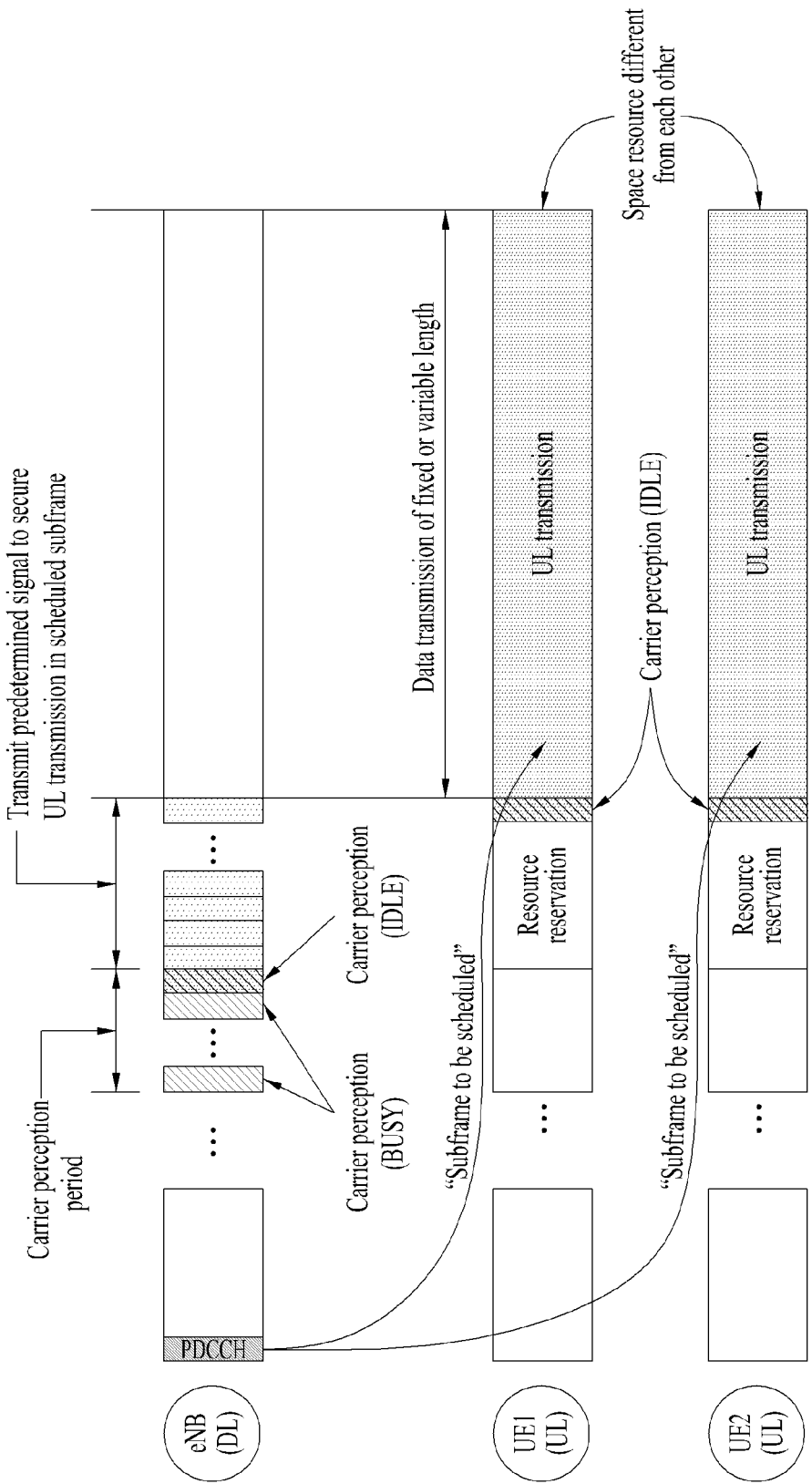

FIG. 15 and FIG. 16 are diagrams for an example of performing UL transmission, which is performed by multiple users using a non-licensed band according to embodiment of the present invention. In particular, FIG. 15 and FIG. 16 exemplify that a UE 1 and a UE 2 are multiplexed in the non-licensed band using a spatial multiplexing scheme.

First of all, referring to FIG. 15, the UE 1 recognizes that the non-licensed band is in an idle state in a manner of performing a carrier perception procedure and then transmits a resource reservation signal. If the UE 2 detects the resource reservation signal of the UE 1, the UE 2 can recognize that a resource reservation for a UL transmission is made. Hence, the UE 1 and the UE 2 can perform the UL transmission in a scheduled subframe according to a UL scheduling grant.

Similar to FIG. 14, FIG. 16 exemplifies a case that an eNB uses a predetermined signal or a predetermined sequence as a resource reservation signal. The eNB can occupy a resource for a UL transmission of the UE 1 and the UE 1 in advance using the signal or the sequence.

As depicted in FIG. 15 and FIG. 16, a carrier perception and a resource reservation signal transmission can be performed by an eNB or a UE. In terms of a UL transmission performed by the UE, it may be more useful for the UE to transmit a designated resource reservation signal via a carrier perception.

Meanwhile, a plurality of users can share a frequency resource. In case of using a resource reservation signal recognizable by the users capable of sharing a UL frequency resource is used, although a single user makes a reservation for a PUSCH resource by transmitting a resource reservation signal, if a different user is judged as a user sharing a frequency resource in a manner of detecting the resource reservation signal, PUSCH transmission can be performed by the different user on a designated time. Unlike MU-MIMO, it means to transmit in a manner of differentiating a frequency in OFDMA or DFT-s-OFDMA.

Figure 17:
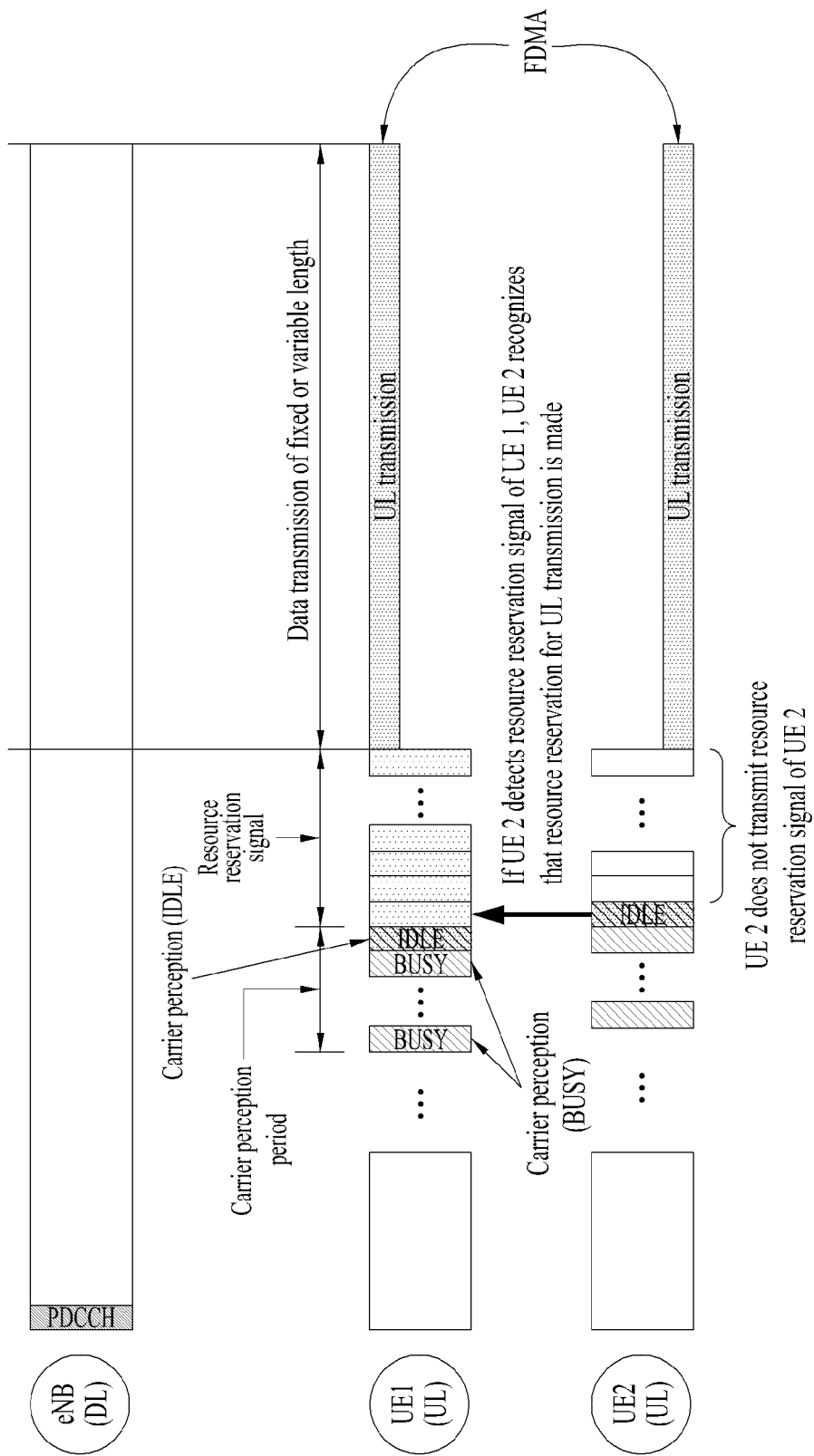
FIG. 17 and FIG. 18 are diagrams for a different example of performing UL transmission, which is performed by multiple users using a non-licensed band according to embodiment of the present invention.
Figure 18:
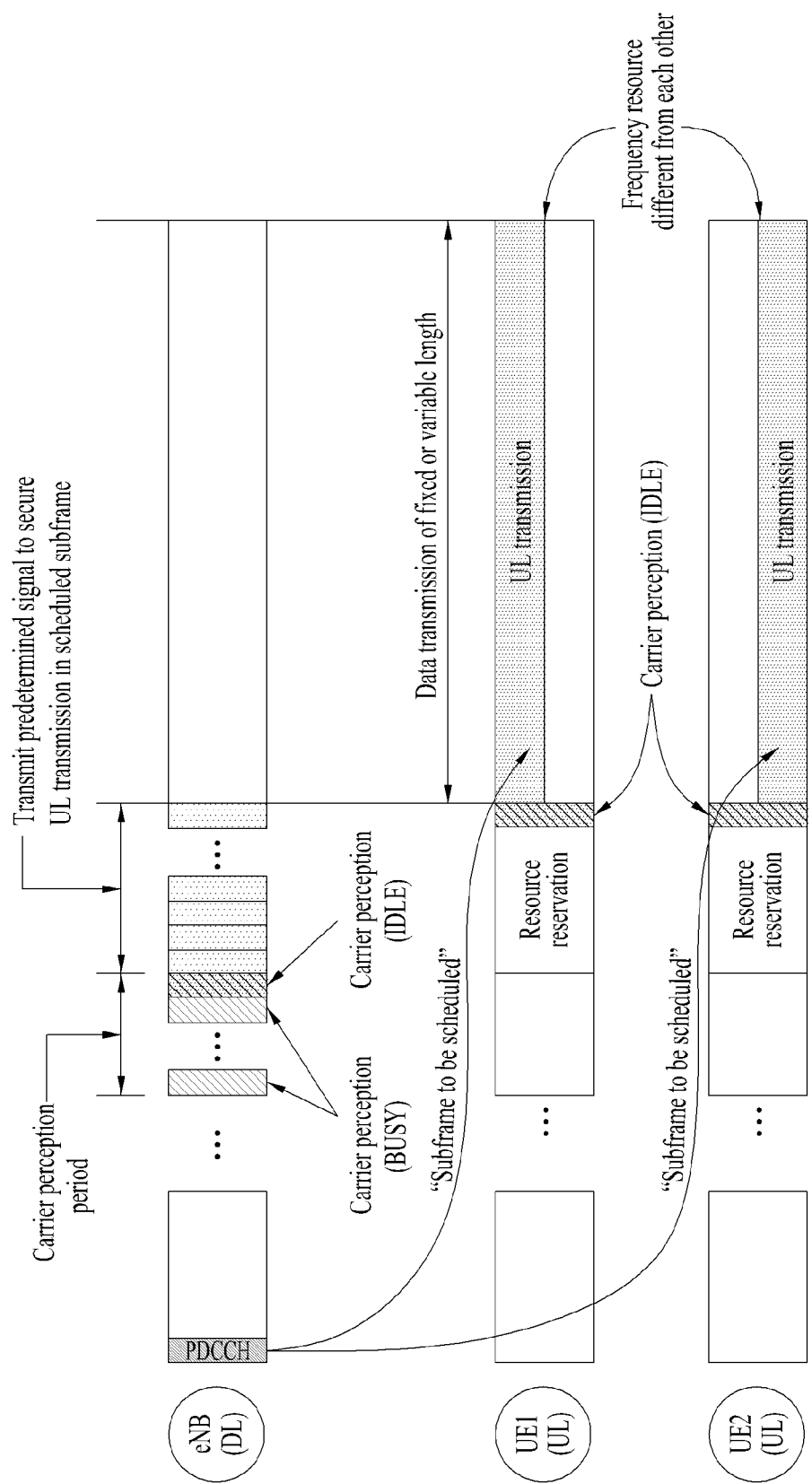

FIG. 17 and FIG. 18 are diagrams for a different example of performing UL transmission, which is performed by multiple users using a non-licensed band according to embodiment of the present invention. In particular, FIG. 17 and FIG. 18 exemplify that a UE 1 and a UE 2 are multiplexed in the non-licensed band using a frequency division multiplexing scheme.

First of all, referring to FIG. 17, the UE 1 recognizes that the non-licensed band is in an idle state in a manner of performing a carrier perception procedure and then transmits a resource reservation signal. If the UE 2 detects the resource reservation signal of the UE 1, the UE 2 can recognize that a resource reservation for a UL transmission is made. Hence, the UE 1 and the UE 2 can perform the UL transmission in a scheduled subframe according to a UL scheduling grant.

Similar to FIG. 14, FIG. 18 exemplifies a case that an eNB uses a predetermined signal or a predetermined sequence as a resource reservation signal. The eNB can occupy a resource for a UL transmission of the UE 1 and the UE 2 in advance using the signal or the sequence.

Meanwhile, it is necessary to consider a method of detecting a third UE or a third eNB, which is not likely to be detected by a carrier perception, i.e., a hidden eNB or a hidden UE. To this end, it is necessary to perform the carrier perception in a manner of extending its range to a range of which UEs within a cell are affected by the hidden eNB/UE.

Figure 19:
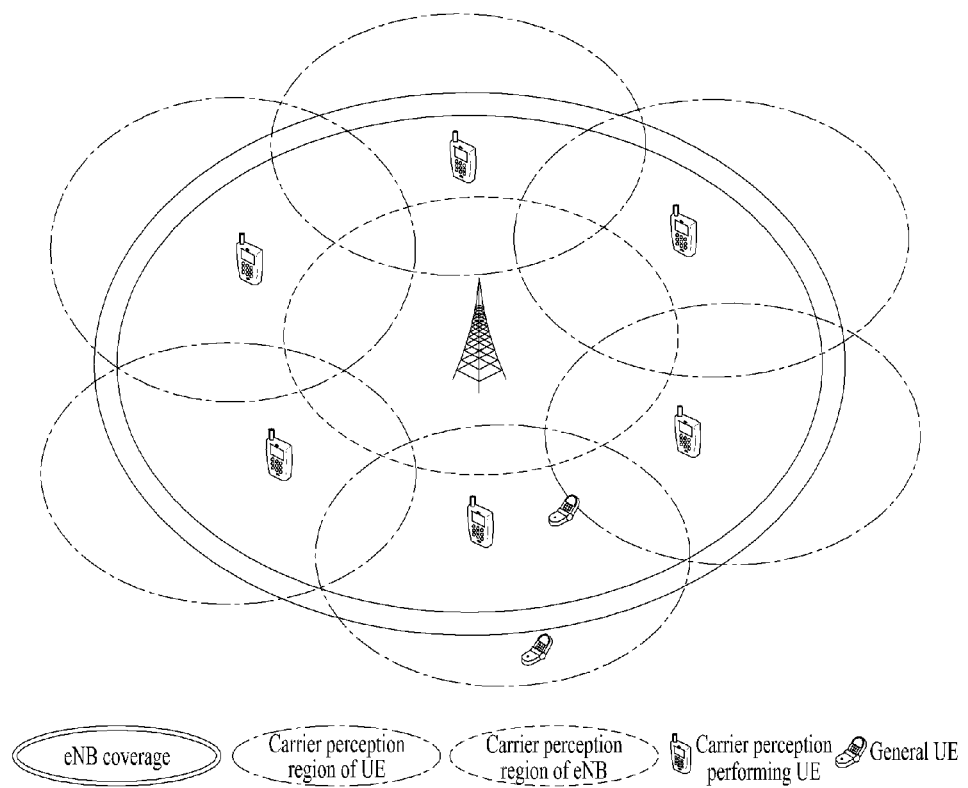
FIG. 19 and FIG. 20 are diagrams of a method of detecting a third UE or a third eNB.
Figure 20:
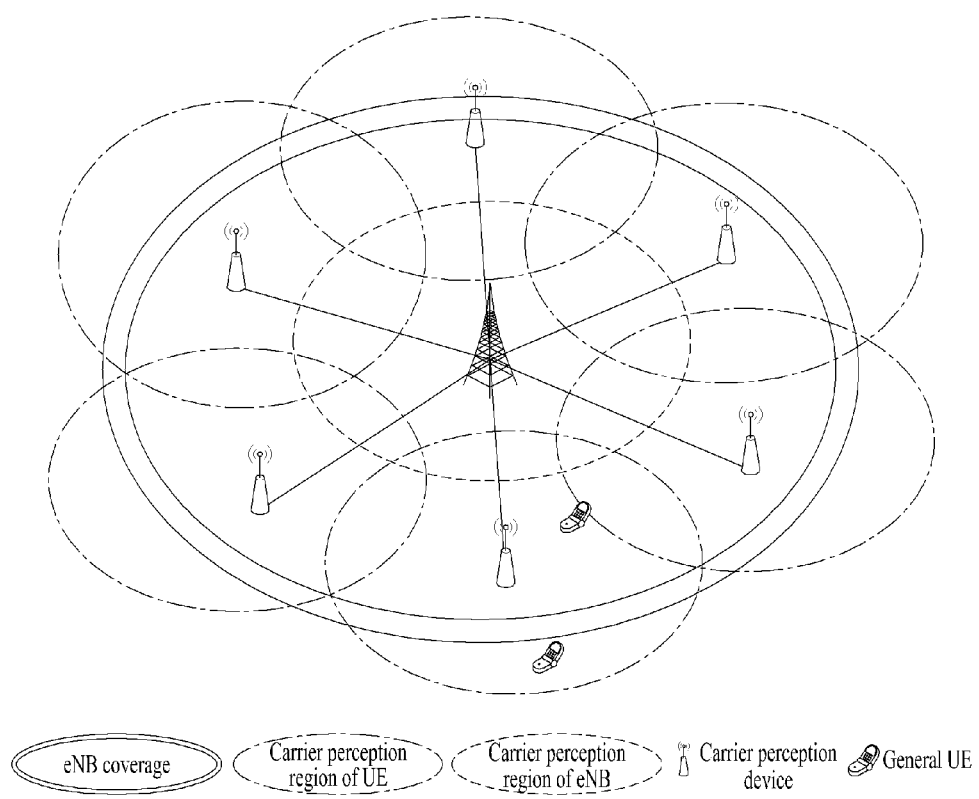

FIG. 19 and FIG. 20 are diagrams of a method of detecting a third UE or a third eNB.

In particular, referring to FIG. 19 and FIG. 20, in order to precisely detect an extended coverage, i.e., a range to which a hidden eNB/UE affects, carrier perception devices are installed in several places in a cell and transmission/reception is performed based on a result of carrier perceptions. As depicted in FIG. 19, a main entity for performing a carrier perception may correspond to predetermined specific UEs or may correspond to separate perception devices depicted in FIG. 20. In case of the separate perception devices, the devices can be connected to an eNB in wireless or in wired.

Meanwhile, in case of performing UL transmission by a plurality of UEs via the non-licensed band, it is necessary to consider a timing advance (hereinafter abbreviated TA), which is applicable to each UE. The TA is explained in detail in the following description.

Since a propagation delay of a DL signal transmitted from an eNB varies depending on a position of a UE within a cell, a UL signal reception timing in the eNB is arranged by transmitting a TA (timing advance) command to each UE to compensate for the propagation delay in LTE system. In particular, a UE positioned apart from the eNB attempts to initiate a transmission at a relatively early hour and a UE positioned near the eNB attempts to initiate a transmission at a relatively late hour to identically maintain arrival timing to the eNB. In spite of the attempts, a value of the timing advance may be inevitably incorrect due to such a reason as a timing jitter and the like.

Figure 21:
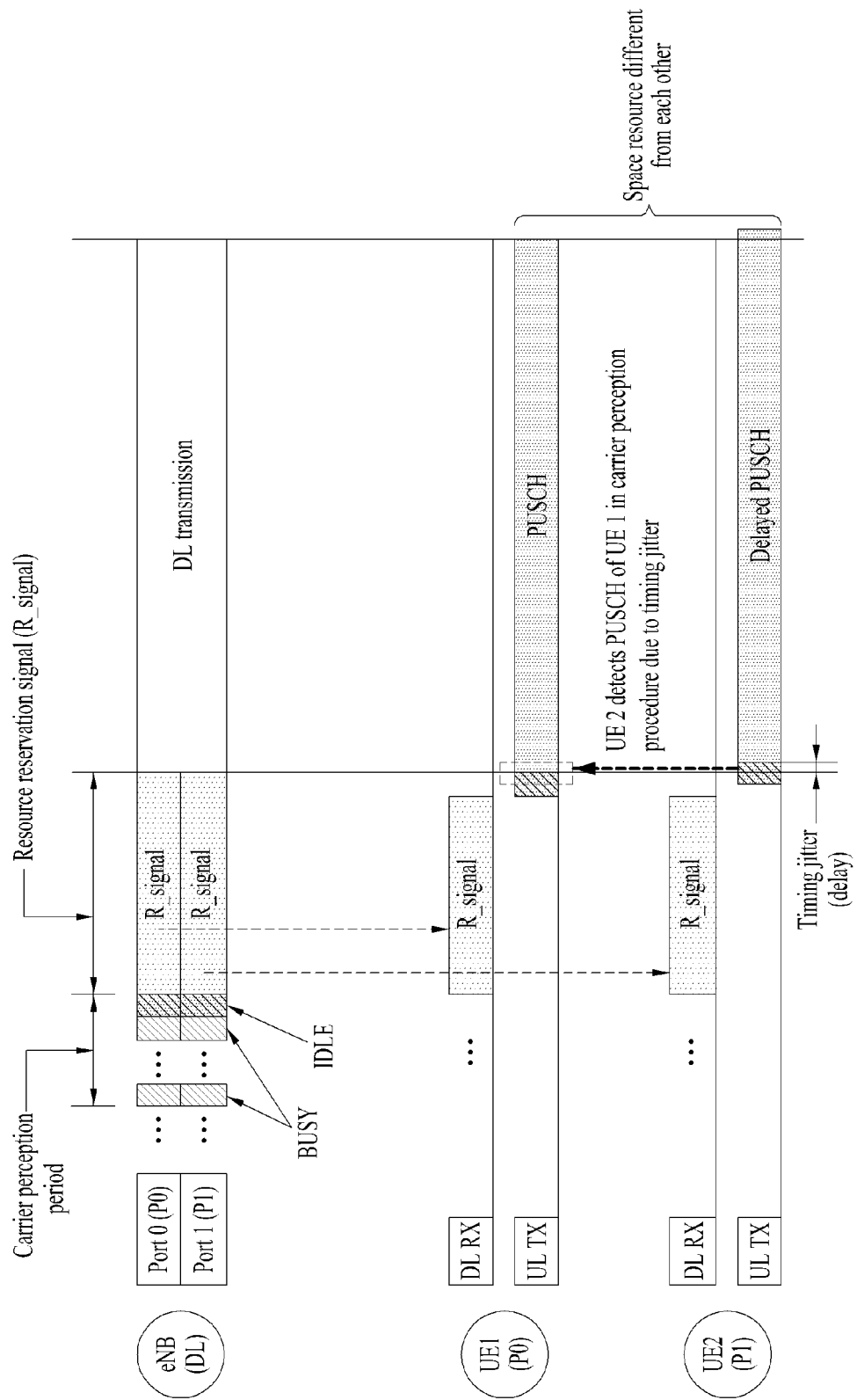
FIG. 21 exemplifies a problem occurred due to a discordance of a timing advance in case that multiple users perform a UL transmission using a non-licensed band according to embodiment of the present invention.

FIG. 21 exemplifies a problem occurred due to a discordance of a timing advance in case that multiple users perform a UL transmission using a non-licensed band according to embodiment of the present invention. In particular, FIG. 21 indicates a case of perceiving a carrier one more time immediately before a UE performs a UL transmission. Assume that a carrier perception and an actual transmission are performed in a manner of being little bit delayed although the timing advance of a UE 2 is given by 0.

Referring to FIG. 21, if a timing advance is improperly applied due to a timing jitter, a UE 2 detects a PUSCH transmission of a UE 1 and then the UE 2 can judge that a corresponding non-licensed band is in a busy state. Hence, a UL transmission of the UE 2 may fail.

Hence, in order to improve the aforementioned problem, the present invention proposes to have a transmission gap for a prescribed time after a carrier perception is performed when the carrier perception is performed one more time immediately before a UE performs a UL transmission.

Figure 22:
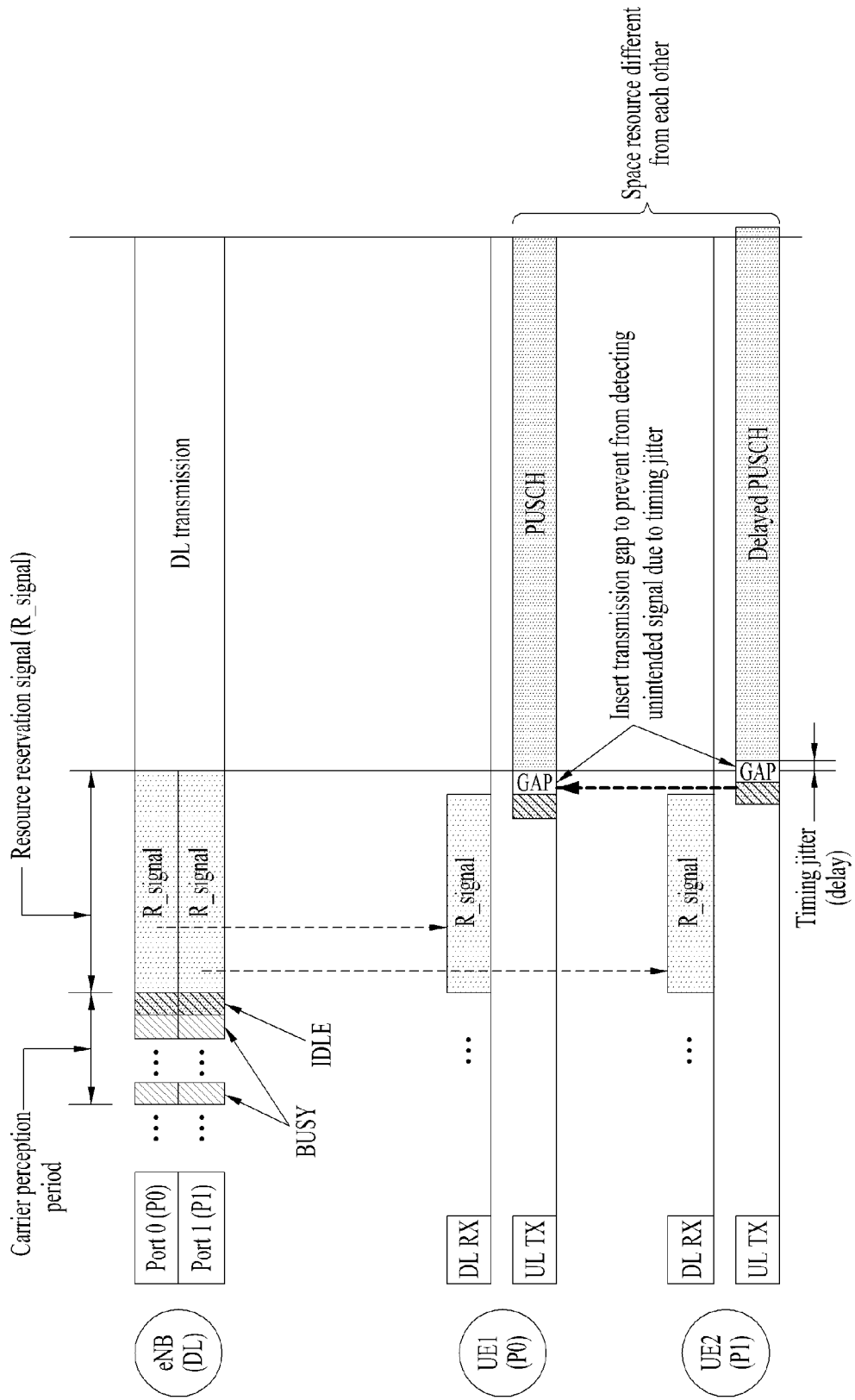
FIG. 22 is a diagram for an example of configuring a transmission gap in case that multiple users perform UL transmission using a non-licensed band according to embodiment of the present invention.

FIG. 22 is a diagram for an example of configuring a transmission gap in case that multiple users perform UL transmission using a non-licensed band according to embodiment of the present invention. In particular, FIG. 22 assumes a case that a UE 1 and a UE 2 perform a UL transmission via a space resource different from each other.

Figure 23:
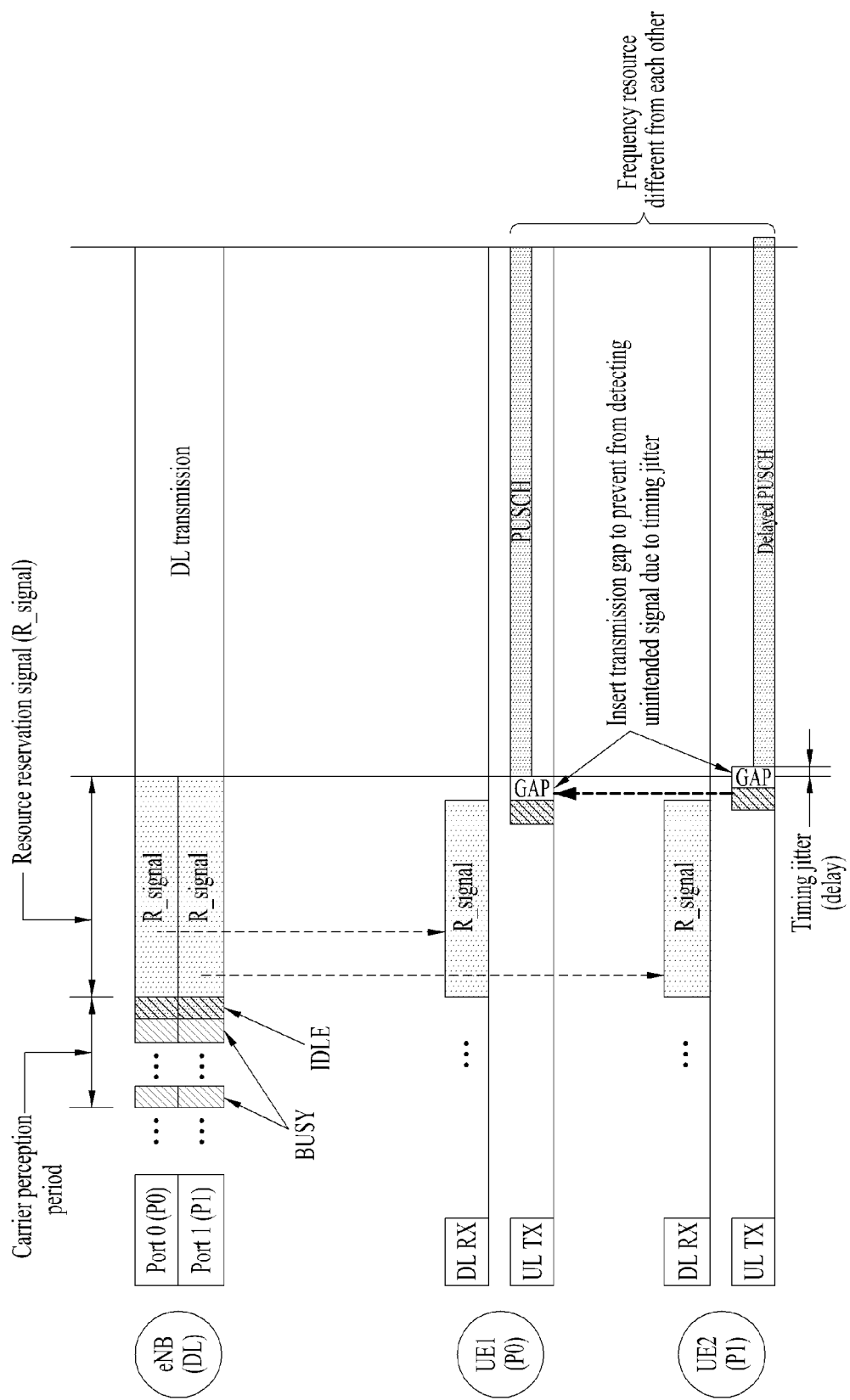
FIG. 23 is a diagram for a different example of configuring a transmission gap in case that multiple users perform UL transmission using a non-licensed band according to embodiment of the present invention.

FIG. 23 is a diagram for a different example of configuring a transmission gap in case that multiple users perform UL transmission using a non-licensed band according to embodiment of the present invention. In particular, FIG. 23 assumes a case that a UE 1 and a UE 2 perform a UL transmission via a frequency resource different from each other.

Referring to FIG. 22 and FIG. 23, an error of detecting PUSCH in a carrier perception procedure of a UE 2 can be avoided by inserting the transmission gap. The transmission gap can be implemented together with Rx-Tx switching time securement in terms of a UE. In particular, a transmission and reception timing is designed in consideration of an Rx operation performed until a carrier perception, a prescribed time taken for switching, and a transmission gap to solve the previously raised problem. Of course, it is also able to design one by one.

Although FIG. 22 and FIG. 23 show an example that an eNB performs a carrier perception and transmits a resource reservation signal, a UE may perform a carrier perception and may directly transmit a resource reservation signal according to a result of the carrier perception.

In the following description, embodiment of the present invention is explained in more detail.

Figure 24:
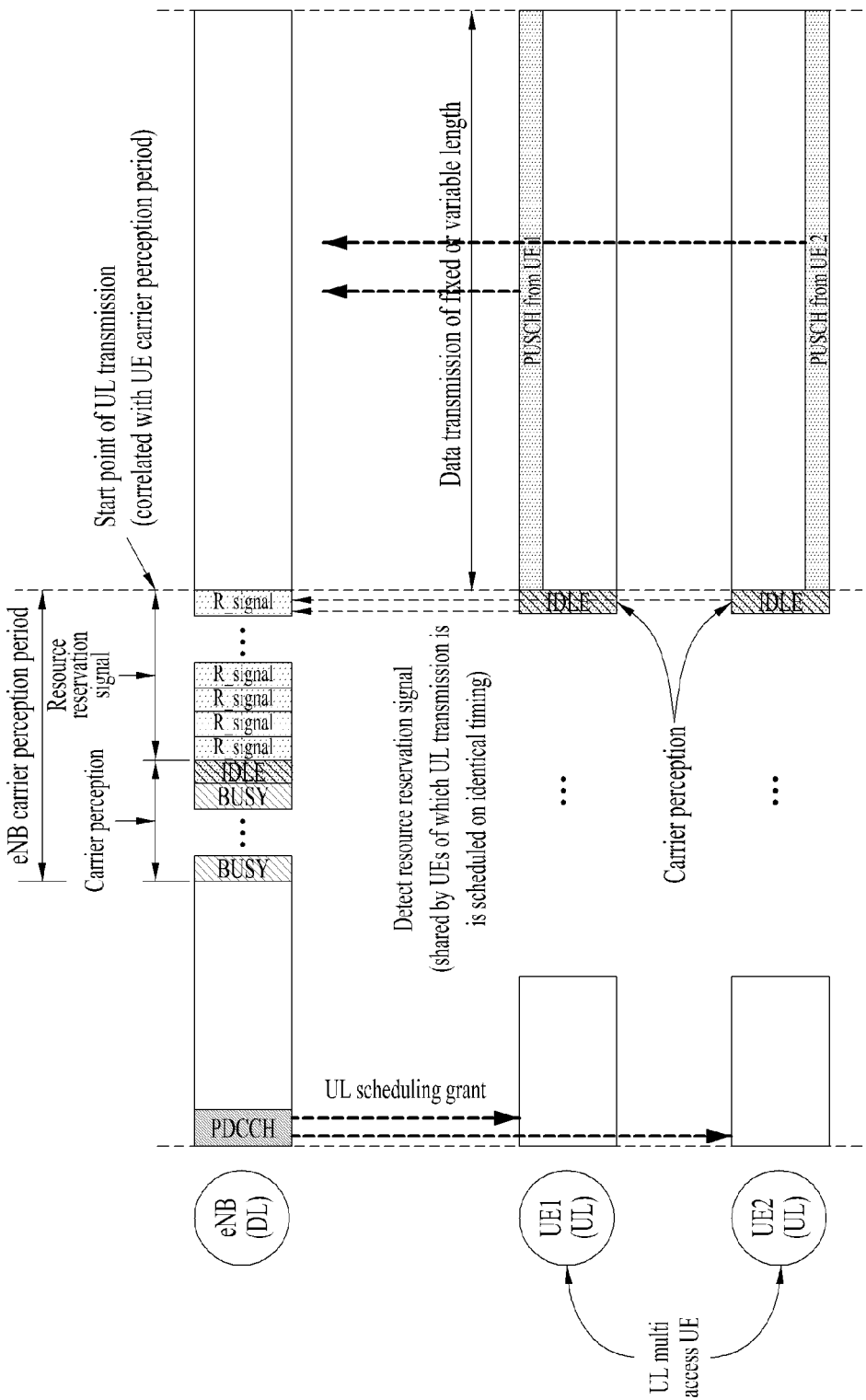
FIG. 24 is a diagram for an example of a method for enabling a plurality of user equipments to perform multiple accesses in a frequency division multiplexing scheme via a non-licensed band in uplink according to embodiment of the present invention.

FIG. 24 is a diagram for an example of a method for enabling a plurality of user equipments to perform multiple accesses in a frequency division multiplexing scheme via a non-licensed band in uplink according to embodiment of the present invention.

Referring to FIG. 24, if a predetermined resource reservation signal is detected as a result of performing a carrier perception procedure performed by UEs scheduled in an identical time period (i.e., a subframe), the UEs judge that the non-licensed band is in an idle state and can perform a UL transmission on a specific timing, i.e., in a scheduled subframe.

In consideration of a compatibility with a legacy LTE system, If a UL scheduling grant is transmitted in a subframe #n, PUSCH transmission should be performed in a subframe #n+4. Hence, it is important to secure a UL resource by performing a carrier perception procedure prior to the subframe #n+4. As mentioned in the foregoing description, if a resource reservation signal transmitted by an eNB is detected, a UE judges that the eNB has secured a corresponding channel. And then, the UE can initiate a UL transmission. Although a plurality of UEs simultaneously perform UL transmissions, a collision problem does not occur since each of assigned frequency resources is different from each other. Moreover, in case of scheduling a plurality of UL subframes in a single UL scheduling grant, the same method can be applied as well.

Meanwhile, it is not necessary to operate a period for transmitting the resource reservation signal or a period for monitoring a resource reservation signal monitored by UEs in accordance with a frame structure of a legacy LTE system. For instance, an eNB performs a carrier perception on a second slot of a subframe #n+$k_1$ ($k_1$=3, 4, and 5). If a corresponding band is in an idle state, the eNB informs the UEs of the resource reservation signal to make the UEs initiate a UL transmission in a scheduled subframe by transmitting the resource reservation signal to the UEs.

And, scheduled UEs monitor the resource reservation signal from the second slot of the subframe #n+$k_1$. If it is judged that a corresponding band is in an idle state, the scheduled UEs initiate a UL PUSCH transmission. In this case, if a PUSCH transmission timing is assumed to be a subframe boundary, the PUSCH transmission will be performed in a subframe #n+$k_2$ ($k_2$=4, 5, and 6).

Hence, it is preferable to elastically manage a start and end point of a resource reservation signal, a start and end point of a period monitored by a UE, and a start and end point of a PUSCH transmission.

And, each UE should be aware of a resource reservation signal assigned to the each UE. For instance, if a k sequence among N number of sequences is assigned to a UE as a resource reservation signal, this information should be informed to the UE in advance. Or, M number of resource reservation signals can be informed to the UE in advance by an RRC signaling and the like. Information on a resource reservation signal to be used among the M number of resource reservation signals can be informed to a UE by such a physical channel as a UL scheduling grant.

Meanwhile, although it is assumed that an eNB transmits a resource reservation signal in FIG. 24, it is also possible for UEs to transmit an identical resource reservation signal. This is because a fact that the resource reservation signal transmitted by the eNB or the corresponding UEs makes a reservation for a corresponding band can be informed to a different UE or an eNB/AP. In particular, it may reduce a possibility of initiating a transmission in a corresponding band transmitted by UEs not received the resource reservation signal from the eNB or UEs of a different system. Moreover, in order to improve such a problem as a hidden UE or a hidden eNB, it may perform a carrier perception procedure once again immediately before a PUSCH transmission.

Figure 25:
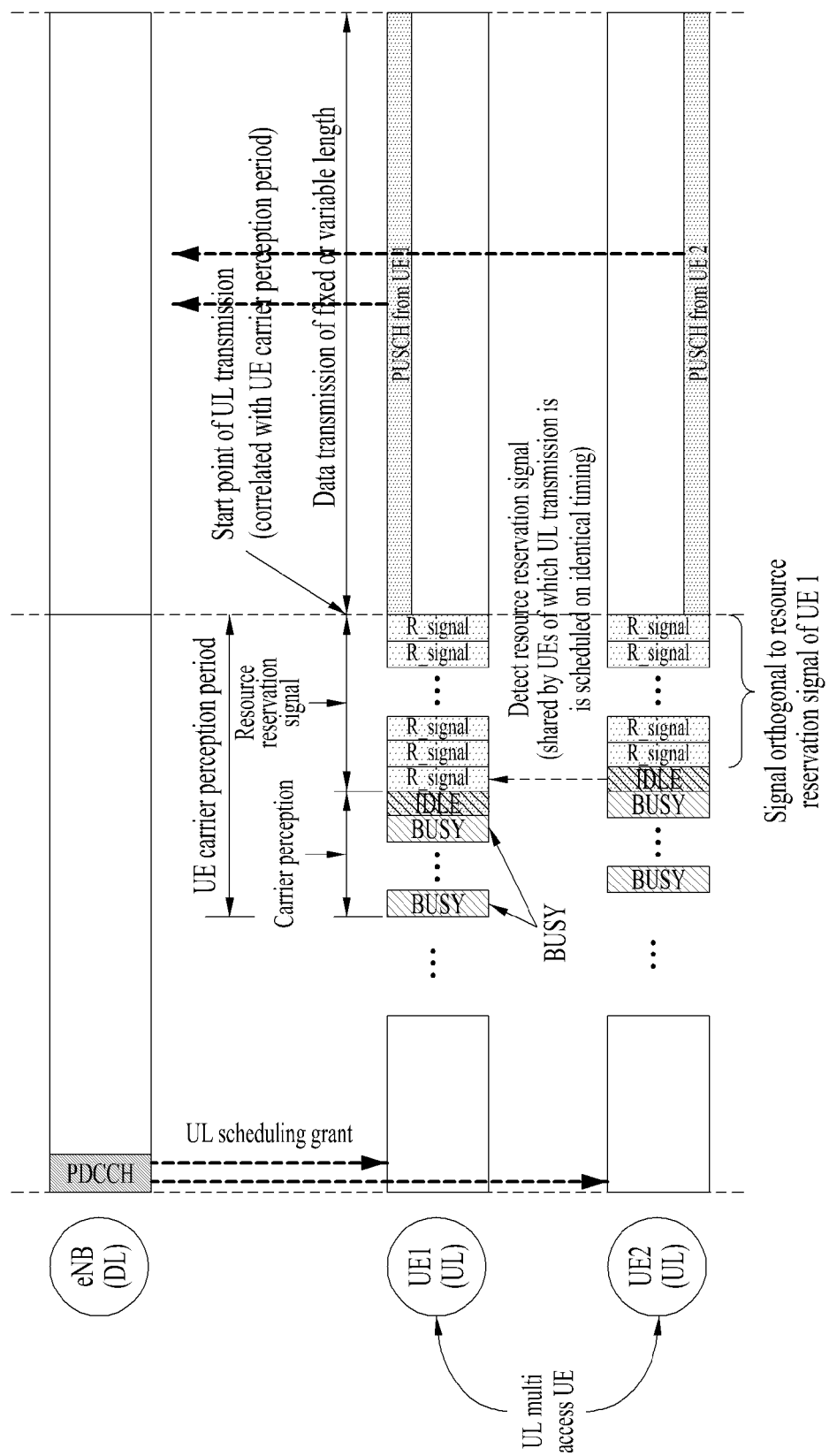
FIG. 25 is a diagram for an example of a different method for enabling a plurality of user equipments to perform multiple accesses in a frequency division multiplexing scheme via a non-licensed band in uplink according to embodiment of the present invention.

FIG. 25 is a diagram for an example of a different method for enabling a plurality of user equipments to perform multiple accesses in a frequency division multiplexing scheme via a non-licensed band in uplink according to embodiment of the present invention.

In particular, FIG. 25 indicates that a UE performs a carrier perception procedure and transmits a resource reservation signal according to a result of the carrier perception procedure. Of course, although only a UE firstly transmitting a resource reservation signal can transmit the resource reservation signal, a hidden node problem can be solved by making a different UE transmit the resource reservation signal in case of a signal orthogonal to the resource reservation signal. Of course, it may also be helpful for mitigating an identical problem for an eNB to transmit the resource reservation signal together with a UE 1 when the resource reservation signal of the UE 1 is detected.

And, it is possible to use a last symbol of a subframe previous to a subframe in which a PUSCH transmission is initiated therein or N number of symbol for a usage of a carrier perception and a resource reservation signal only to reduce quantity of resource occupied by a resource reservation signal. Moreover, if information on whether at least one subframe prior to a transmission of PUSCH is used can be known in advance, a last symbol of a subframe previous to a subframe in which a PUSCH transmission is initiated therein or N number of symbol can be used for a usage of transmitting a resource reservation signal for a case that at least one subframe prior to a transmission of PUSCH is not used only.

Although the above proposed technology is explained centering on a UL transmission, it is also applicable to a DL.

First of all, assume that an eNB has a capability of using a licensed band and a non-licensed band at the same time. Similarly, assume that a UE has a capability of operating according to an indication of the eNB.

Prior to transmitting a DL scheduling grant/UL scheduling grant to a UE, an eNB performs a carrier perception in advance to check whether a DL/UL transmission is feasible in such a designated position as a corresponding subframe or a slot. If it is judged that a corresponding band is usable as a result of performing the carrier perception, the eNB transmit the DL scheduling grant/UL scheduling grant to the UE.

The DL scheduling grant and PDSCH can be transmitted together in one subframe. Yet, in case of transmitting in a plurality of subframes, the DL scheduling grant and PDSCH can be separately transmitted according to a predetermined rule. Meanwhile, in case of a UL transmission, if it is assumed that PUSCH is transmitted in a subframe n+4 and a UL scheduling grant for the PUSCH is transmitted in a subframe n, a carrier perception is performed prior to the subframe n+4.

If there exists a DL/UL subframe configuration signal (or, a subframe pattern), the proposed method can be enhanced using the DL/UL subframe configuration signal. In particular, since it is able to identify a subframe corresponding to a UL subframe transmitting PUSCH using the DL/UL subframe configuration signal, it is able to make an eNB perform a carrier perception immediately before the UL subframe to secure the UL subframe, thereby reducing a monitoring overhead.

Although a corresponding band is secured by using a DL/UL subframe configuration signal (or, a subframe pattern), if an actual transmission is not made, a different system or a different UE may occupy the corresponding band. Hence, it is preferable to perform a carrier perception and to transmit a resource reservation signal via the carrier perception in order to prevent the corresponding band from being occupied by a different system or a different UE.

As mentioned in the foregoing description, it is preferable to perform a carrier perception only in a last specific period (e.g., a slot unit or a symbol unit) immediately before a subframe transmitting PUSCH to reduce a burden of a resource reservation signal. In this case, if a corresponding band becomes unavailable, a PUSCH transmission is not performed. Based on the PUSCH transmission failure, a time period for performing a carrier perception and a frequency band can be adjusted. By doing this, PUSCH transmission failure rate can be constantly maintained in some degree.

Figure 26:
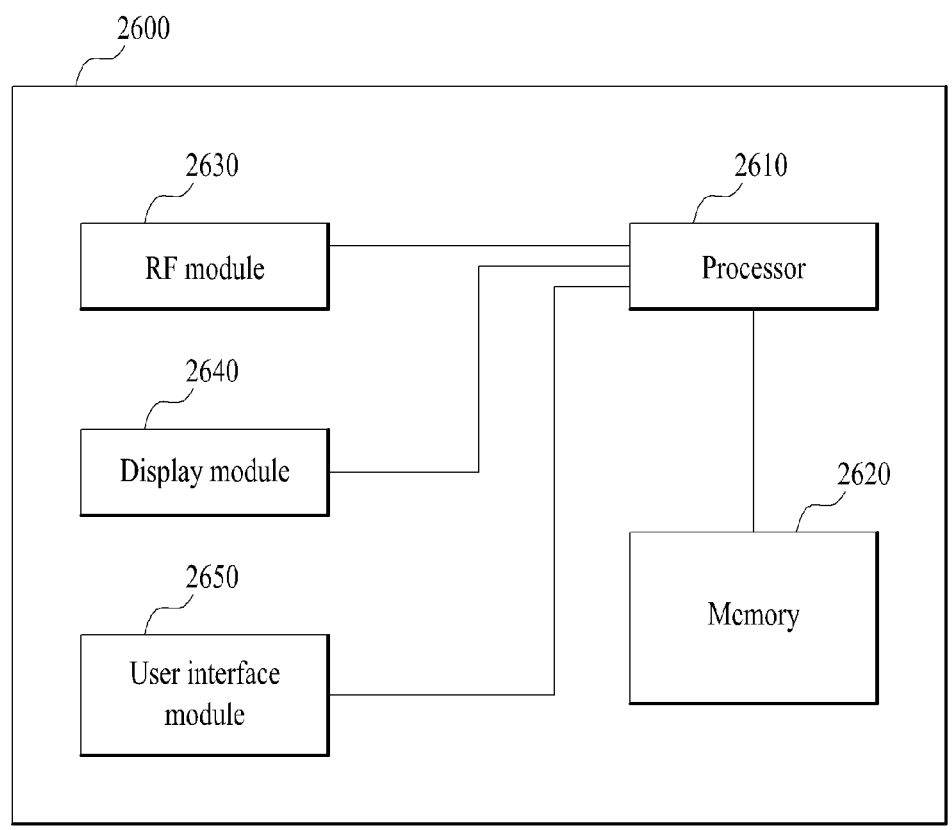
FIG. 26 is a block diagram of an example for a communication device according to one embodiment of the present invention.

FIG. 26 is a block diagram of an example for a communication device according to one embodiment of the present invention.

Referring to FIG. 26, a communication device 2600 may include a processor 2610, a memory 2620, an RF module 2630, a display module 2640, and a user interface module 2650.

Since the communication device 2600 is depicted for clarity of description, prescribed module(s) may be omitted in part. The communication device 2600 may further include necessary module(s). And, a prescribed module of the communication device 2600 may be divided into subdivided modules. A processor 2610 is configured to perform an operation according to the embodiments of the present invention illustrated with reference to drawings. In particular, the detailed operation of the processor 2610 may refer to the former contents described with reference to FIG. 1 to FIG. 25.

The memory 2620 is connected with the processor 2610 and stores an operating system, applications, program codes, data, and the like. The RF module 2630 is connected with the processor 2610 and then performs a function of converting a baseband signal to a radio signal or a function of converting a radio signal to a baseband signal. To this end, the RF module 2630 performs an analog conversion, amplification, a filtering, and a frequency up conversion, or performs processes inverse to the former processes. The display module 2640 is connected with the processor 2610 and displays various kinds of informations. And, the display module 2640 can be implemented using such a well-known component as an LCD (liquid crystal display), an LED (light emitting diode), an OLED (organic light emitting diode) display and the like, by which the present invention may be non-limited. The user interface module 2650 is connected with the processor 2610 and can be configured in a manner of being combined with such a well-known user interface as a keypad, a touchscreen and the like.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although a method of multiplexing a signal related to a plurality of user equipments in a wireless communication system to which the aforementioned carrier aggregation scheme is applied and an apparatus therefor are described with reference to examples applied to 3GPP LTE system, it may be applicable to various kinds of wireless communication systems as well as the 3GPP LTE system.

What is claimed is:

1. A method of transmitting an uplink signal via a non-licensed band by a first user equipment in a wireless communication system to which a carrier aggregation scheme is applied, the method comprising:
   receiving an uplink scheduling grant from an eNode B;
   detecting a resource reservation signal of a second user equipment;
   when the resource reservation signal of the second user equipment corresponds to a predetermined signal indicating that the non-licensed band is reserved by the second user equipment and the second user equipment shares an uplink resource with the first user equipment, configuring the non-licensed band as an available resource; and
   transmitting the uplink signal to the eNode B via the non-licensed band based on the uplink scheduling grant.

2. The method of claim 1, wherein the uplink signal transmitted by the first user equipment is multiplexed with an uplink signal transmitted by the second user equipment in terms of a space resource or a frequency resource in the non-licensed band.

3. The method of claim 1, wherein the predetermined signal is shared by the first user equipment and the second user equipment in advance.

4. The method of claim 1, wherein transmitting the uplink signal comprises re-determining whether the non-licensed band is available before a transmission timing of the uplink signal.

5. The method of claim 4, wherein transmitting the uplink signal comprises transmitting the uplink signal to the eNode B after a predetermined transmission gap, if the non-licensed band is available as a result of re-determining.

6. The method of claim 1, wherein the uplink scheduling grant is received via a licensed band.

7. A first user equipment device in a wireless communication system to which a carrier aggregation scheme is applied, the first user equipment device comprising:
   a receiving module configured to receive an uplink scheduling grant from an eNode B;
   a processor configured to detect a resource reservation signal of a second user equipment device and to set the non-licensed band as an available resource when the resource reservation signal of the second user equipment device corresponds to a predetermined signal indicating that the non-licensed band is reserved by the second user equipment device and the second user equipment device shares an uplink resource with the first user equipment device; and
   a transmitting module configured to transmit an uplink signal to the eNode B via the non-licensed band based on the uplink scheduling grant.

8. The first user equipment device of claim 7, wherein the uplink signal transmitted by the first user equipment device is multiplexed with an uplink signal transmitted by the second user equipment device in terms of a space resource or a frequency resource in the non-licensed band.

9. The first user equipment device of claim 7, wherein the predetermined signal is shared by the first user equipment device and the second user equipment device in advance.

10. The first user equipment device of claim 7, wherein the processor is further configured to re-determine whether the non-licensed band is available before a transmission timing of the uplink signal.

11. The first user equipment device of claim 10, wherein, if the non-licensed band is available as a result of re-determining, the processor is further configured to control the transmitting module to transmit the uplink signal to the eNode B after a predetermined transmission gap.

12. The first user equipment device of claim 7, wherein the uplink scheduling grant is received via a licensed band.

* * * * *